United States Patent
Marcovitch et al.

(10) Patent No.: US 11,785,087 B1
(45) Date of Patent: Oct. 10, 2023

(54) REMOTE DIRECT MEMORY ACCESS OPERATIONS WITH INTEGRATED DATA ARRIVAL INDICATION

(71) Applicant: Mellanox Technologies, Ltd., Yokneam (IL)

(72) Inventors: Daniel Marcovitch, Yokneam Illit (IL); Richard Graham, Knoxville, TN (US)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/977,905

(22) Filed: Oct. 31, 2022

(51) Int. Cl.
*H04L 67/1097* (2022.01)
*G06F 13/42* (2006.01)
*G06F 15/173* (2006.01)

(52) U.S. Cl.
CPC ...... *H04L 67/1097* (2013.01); *G06F 13/4265* (2013.01); *G06F 15/17331* (2013.01)

(58) Field of Classification Search
CPC ...... G06F 12/1081; G06F 12/00; G06F 13/28; G05B 2219/34196
See application file for complete search history.

(56) References Cited

U.S. PATENT DOCUMENTS

| | | | | |
|---|---|---|---|---|
| 5,159,671 A * | 10/1992 | Iwami | ................. | G06F 13/28 714/6.32 |
| 5,878,217 A * | 3/1999 | Cherukuri | ............. | G06F 13/387 709/212 |
| 6,115,803 A * | 9/2000 | Hayashi | ................. | G06F 9/54 709/206 |
| 6,463,478 B1 * | 10/2002 | Lau | ........................ | H04L 47/30 709/224 |
| 7,904,614 B1 * | 3/2011 | Marshall | ................ | G06F 13/28 710/28 |
| 8,548,900 B1 * | 10/2013 | Glackin | ................ | G06Q 40/06 705/37 |
| 10,031,861 B2 * | 7/2018 | Chhabra | ............. | G06F 12/0802 |
| 10,079,916 B2 * | 9/2018 | Roberts | ................. | H04L 45/74 |
| 2005/0050244 A1 * | 3/2005 | Oda | ................... | G06F 12/0868 710/33 |
| 2006/0179255 A1 * | 8/2006 | Yamazaki | ............ | G06F 15/167 711/147 |
| 2008/0301327 A1 * | 12/2008 | Archer | ................... | G06F 13/28 710/22 |
| 2008/0313661 A1 * | 12/2008 | Blocksome | .......... | G06F 15/167 719/330 |
| 2010/0008378 A1 * | 1/2010 | Luan | ...................... | H04L 47/29 370/415 |
| 2010/0268852 A1 * | 10/2010 | Archer | ................... | G06F 13/28 710/22 |
| 2010/0274868 A1 * | 10/2010 | Arroyo | ..................... | G06F 9/52 709/212 |
| 2016/0132251 A1 * | 5/2016 | Hwang | ................ | G06F 3/0679 711/154 |

(Continued)

*Primary Examiner* — Shean Tokuta
(74) *Attorney, Agent, or Firm* — Lowenstein Sandler LLP

(57) ABSTRACT

Disclosed are apparatuses, systems, and techniques that improve efficiency and decrease latency of remote direct memory access (RDMA) operations. The techniques include but are not limited to unified RDMA operations that are recognizable by various communicating devices, such as network controllers and target memory devices, as requests to establish, set, and/or update arrival indicators in the target memory devices responsive to arrival of one or more portions of the data being communicated.

27 Claims, 13 Drawing Sheets

(56) References Cited

U.S. PATENT DOCUMENTS

| | | | |
|---|---|---|---|
| 2016/0132271 A1* | 5/2016 | Takada | G06F 3/0659 |
| | | | 711/154 |
| 2016/0350244 A1* | 12/2016 | Tsirkin | G06F 3/0664 |
| 2017/0013143 A1* | 1/2017 | Arita | H04N 1/00095 |
| 2020/0068050 A1* | 2/2020 | Foo | G06F 9/30098 |
| 2021/0218808 A1 | 7/2021 | Graham | |

* cited by examiner

REMOTE DIRECT MEMORY ACCESS OPERATIONS WITH INTEGRATED DATA ARRIVAL INDICATION

TECHNICAL FIELD

At least one embodiment pertains to processing resources used to perform and facilitate network communications. For example, at least one embodiment pertains to remote direct memory access technology, and more specifically, to reducing computational costs and latency encountered in the course of storing data in remote memory devices using unified memory access operations with integrated data arrival indication.

BACKGROUND

Remote direct memory access (RDMA) technology enables network adapters to transfer data over a network directly to (or from) memory of a remote device without storing data in data buffers of the operating system of the remote device. Advantages of RDMA include reduced computations and caching by processing devices, e.g., central processing units (CPUs), elimination of the need to copy the data between various network layers, convenient discretization of transmitted data, and so on. RDMA transactions are supported by a number of communication protocols, including RDMA over Converged Ethernet (RoCE), which facilitates RDMA operations using conventional standard Ethernet infrastructure, Internet Wide Area RDMA Protocol (iWARP), which facilitates RDMA operations using Transmission Control Protocol (TCP), and InfiniBand™, which provides native support for RDMA operations. RDMA transactions are especially useful in cloud computing applications and numerous applications that require high data transmission rates and low latency.

DETAILED DESCRIPTION

Figure 1:
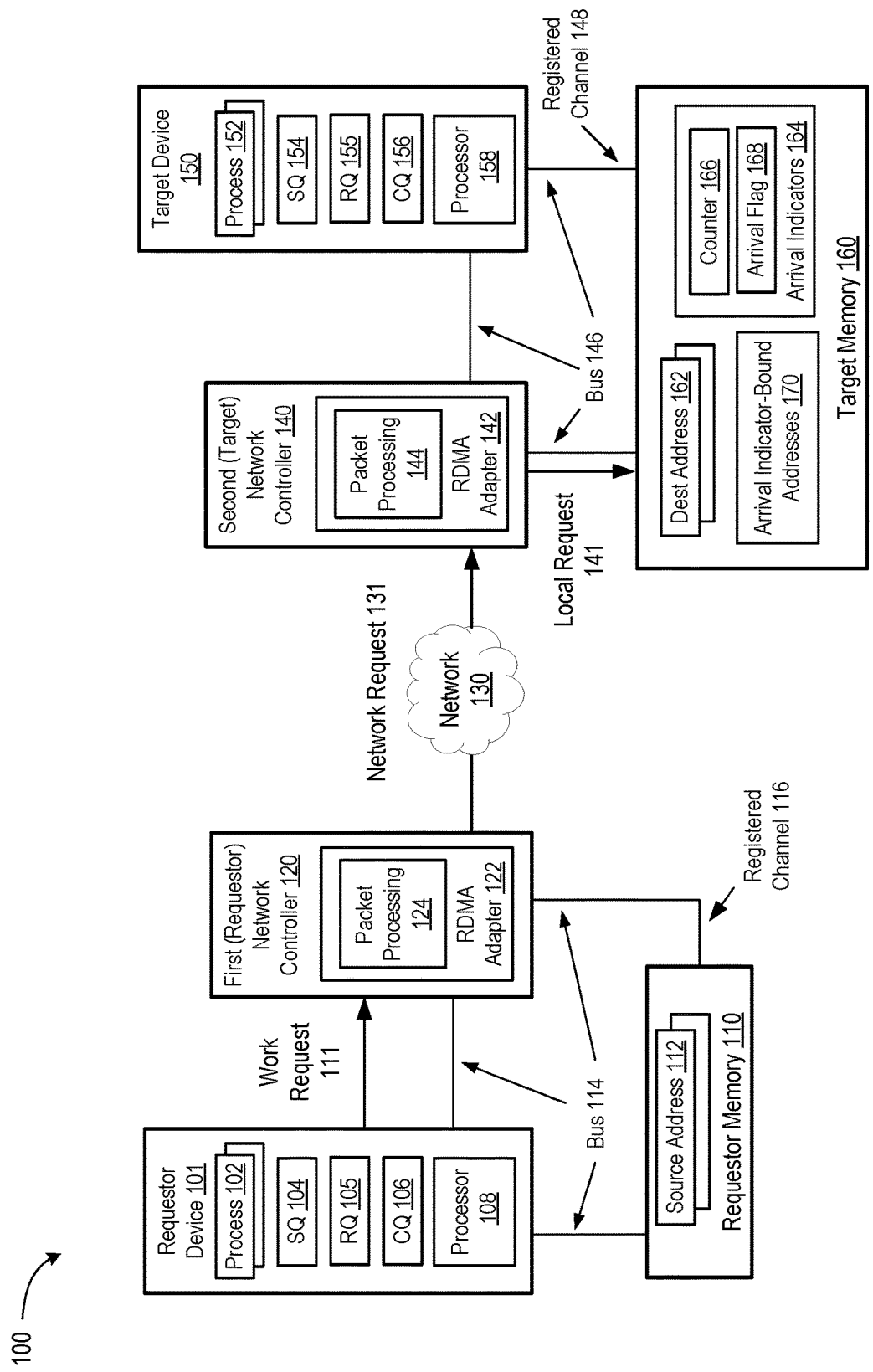
FIG. 1 is a block diagram of an example network architecture capable of implementing unified RDMA operations, according to at least one embodiment.

One-sided RDMA operations (also known as verbs), such as WRITE, READ, and ATOMIC operations (e.g., Fetch and Add, Compare and Swap) operate directly on a remote device's memory while bypassing the remote device's CPU. Two-sided operations, such as SEND and RECEIVE, result in some involvement of the remote device's CPU. For example, the remote device's CPU can specify, using RECEIVE operation, an address for the expected data and the sending device (initiator) can use SEND operation to store the data in the specified address. One-sided RDMA operations, on the other hand, communicate data that can be unexpected by a target device. Correspondingly, RDMA applications often communicate data using WRITE data/flag pairs, with a flag indicating, to an ultimate user or consumer of the data, that the data has arrived in a valid form.

For example, an initiator device (also referred to as the requestor device herein) that is writing data to a remote (target) memory device, can send a work request to a network controller (network adapter, network interface card, etc.) of the requestor device to write a block of data stored in a memory (cache) of the requestor device to a memory of the remote device (also referred to as a target memory herein). The requestor network controller (also referred to as a first network controller herein) can then send an RDMA WRITE request with the data to a target network controller of the target device (also referred to as a second network controller herein). The target network controller can then use a local request (e.g., a direct memory access, or DMA, request) to store the data in the target memory. The target network controller can then communicate an acknowledgment to the requestor device indicating that the data has been written successfully. Consequently, the requestor device can initiate a new RDMA operation (e.g., by sending a new work request to the first network controller) to store a flag in the target memory to serve as an indicator, e.g., to the user/consumer of the data, that the valid data is now stored in the target memory. The new transaction can be another WRITE operation that sets an arrival bit (or some other flag) in the target memory. Alternatively, the new transaction can be an ATOMIC RDMA operation (e.g., an ATOMIC Fetch and Add) that increments a counter in the target memory device. The new transaction can also be a two-sided SEND operation that posts an arrival flag into a completion queue of the target network controller.

Such two-stage (WRITE+flag) RDMA transactions lead to a number of inefficiencies. Additional computational (processing and memory) resources have to be used to process the second request by the requestor network controller and to facilitate propagation of the completion flag to the target network controller and then to the target memory. Such second requests/operations consume the bandwidth of the network and reduce the overall network transmission rate, and also affect local transmission rates between the requestor device (or target memory) and the requestor network controller (or target network controller). Moreover, in some instances, the second operation can use a different network path and arrive before the data in the first operation has been transmitted, resulting in the need to reorder the arrived flag and the data.

Aspects and embodiments of the present disclosure address these and other shortcomings of the existing RDMA technology and provide for unified RDMA operations that facilitate delivery of the data together with explicit or implicit instructions to set or update an arrival indicator upon partial or complete transfer of the data. In some embodiments, a unified operation can be a counting-WRITE operation, which can be identified to the receiving device (e.g., the requestor network controller, the target network controller, the target memory device, etc.) by an operation code (opcode) associated with such a unified operation. A request to perform a unified operation can include a source memory address of data to be transmitted, a destination memory address to store the transmitted data in the target memory, and can further include a memory address for an arrival indicator that signals to a user/consumer of the data that the data has been successfully transmitted and stored in the target memory. Upon receiving the operation request identified by the unified opcode, the target memory can initialize a counter at the memory address selected for the arrival indicator and can increment the counter every time a certain number of bytes (or any other discrete units) of the data has been transmitted and stored. Incrementing the counter can be performed (e.g., by a processor of the target device) using an ATOMIC DMA operation, if the local bus of the target device supports ATOMIC DMA. In those instances where the local bus of the target device does not support ATOMIC DMA, incrementing the counter may be implemented via a logic ATOMIC operation, e.g., performed via a set of READDMA, Modify, WRITEDMA operations. The user/consumer of the data can poll the arrival indicator to determine when the data has arrived. Regardless of the order in which the data arrives at the target memory device (e.g., along different network paths), all the units of the data are ensured to have arrived when the arrival indicator has reached a value associated with a total expected number of the units being transferred. The counting-WRITE operation can be fragmented (e.g., by any intermediary device, e.g., any network controller) into two or more operations that share the same counter and can send two or more portions of the data separately to the target memory. Conversely, two or more counting-WRITE operations that share the same counter can be merged into a single counting-WRITE operation.

In some embodiments, a flagged-WRITE operation can be used instead of (or in addition to) the counting-WRITE operation. A flagged-WRITE operation can be identified by a different opcode. A flagged-WRITE operation causes the target device to set a flag in the target memory once all units of the data have arrived. The flag can be a counter that is incremented once per transaction or any other address in the target memory that is set to a predetermined value once all units of the data are stored in the target memory. Flagged-WRITE operations can be efficiently used to write data that can be transmitted using a single transaction when splitting (fragmentation) of data is not needed.

In yet other embodiments, an attribute-WRITE operation can be defined on the target side. A certain range of memory addresses of the target memory can be assigned an attribute that causes an arrival indicator (e.g., a counter or a flag) to be established when a requestor device uses an RDMA operation to write data to this range of addresses. More specifically, a memory access table on the target device may be a key-value table (e.g., a hash table) with memory addresses stored as values. A certain address value (or a range of addresses) indexed by key1 may be stored in the key-value table together with an instruction (arrival indicator attribute) that causes the arrival indicator to be established once the data has been written into address (or the range of addresses). For example, the requestor device can generate a work request to write a data, which can be a legacy WRITE request that is communicated without a second WRITE, SEND, or ATOMIC request and may reference key1 as a key (index) to the key-value memory access table of the target device. When the data reaches the target network controller, the target network controller can use key1 as an index into the memory access table and may identify the corresponding value address together with the instruction to establish the arrival indicator. Having determined that the target memory address has an associated arrival indicator attribute, the target network controller can execute a local counting-WRITE (or a flagged-WRITE) operation to the target memory address (or a range of addresses) in the target memory. This local operation can cause the target memory to start a counter to count arriving data units or set a flag after all the data units have been successfully written. In some embodiments, the same address may be indexed by multiple keys, e.g., a key-value entry in the memory access table indexed with key2 may include address but without the arrival indicator attribute (e.g., without the instruction to establish the arrival indicator).

Advantages of the disclosed embodiments include but are not limited to reducing latency of RDMA transactions, increasing useful throughput of local bus and network connections, streamlining computational support of RDMA operations, and freeing processing and memory resources for other computational tasks executed by various affected devices, including requestor devices, network controllers, target devices, and the like. Other advantages will be apparent to those skilled in the art in the description of illustrative RDMA operations discussed hereinafter.

FIG. 1 is a block diagram of an example network architecture 100 capable of implementing unified RDMA operations, according to at least one embodiment. As depicted in FIG. 1, network architecture 100 can support operations of a requestor device 101 connected, over local bus 114 to a first network controller 120 (a requestor network controller). The first network controller 120 can be connected, via a network 130, to a second network controller 140 (a target network controller) that supports operations of a target device 150. Network 130 can be a public network (e.g., the Internet), a private network (e.g., a local area network (LAN), or wide area network (WAN)), a wireless network, a personal area network (PAN), or a combination thereof. RDMA operations can support transfer of data from a requestor memory 110 directly to (or from) a target memory 160 without software mediation by target device 150.

Requestor device 101 can support one or more applications (not explicitly shown in FIG. 1) that can manage various processes 102 that control communication of data with various targets, including target memory 160. In some transport protocols, to facilitate memory transfers, processes 102 can post work requests (WRs) to a send queue (SQ) 104 and to a receive queue (RQ) 105. SQ 104 can be used to request one-sided READ, WRITE, and ATOMIC operations and two-sided SEND operations while RQ 105 can be used to facilitate two-sided RECEIVE requests. Similar processes 152 can operate on target device 150 that supports its own SQ 154 and RQ 155. A connection between requestor device 101 and target device 150 bundles SQs and RQs into queue pairs (QPs), e.g., SQ 104 (or RQ 105) on requestor device 101 is paired with RQ 155 (or SQ 154) on target device 150. More specifically, to initiate a connection between requestor device 101 and target device 150, the processes 102 and 152 can create and link one or more queue pairs. In some transport protocols, instead of bundling SQ 104 and RQ 155 (or RQ 105 and SQ 154), requestor device 101 and target device 150 may establish an ad hoc connection.

To perform a data transfer, process 102 creates a work queue element (WQE) that specifies parameters such as the RDMA verb (operation) to be used for data communication and also can define various operation parameters, such as a source address 112 in a requestor memory 110 (where the data is currently stored), a destination address 162 in a target memory 160, and other parameters, as discussed in more detail below. Requestor device 101 can then put the WQE into SQ 104 and send a WR 111 to first network controller 120, which can use an RDMA adapter 122 to perform packet processing 124 of the WQE and transmit the data indicated in source address 112 to second network controller 140 via network 130 using a network request 131. An RDMA adapter 142 can perform packet processing 144 of the received network request 131 (e.g., by generating a local request 141) and store the data at a destination address 162 of target memory 160. In embodiments that use completion-upon-arrival notifications, target device 150 can signal a completion of the data transfer by placing a completion event into a completion queue (CQ) 106 of requestor device 101 indicating that the WQE has been processed by the receiving side. Target device 150 can also maintain CQ 156 to receive completion messages from requestor device 101 when data transfers happen in the opposite direction, from target device 150 to requestor device 101. In embodiments that use completion notifications on the target side, target device 150 can signal completions upon the entirety of the data arriving in target memory 160.

Operation of requestor device 101 and target device 150 can be supported by respective processors 108 and 158, which can include one or more processing devices, such as CPUs, graphics processing units (GPUs), application-specific integrated circuits (ASICs), field-programmable gate arrays (FPGAs), or any combination thereof. In some embodiments, any of requestor device 101, the first network controller 120, and/or requestor memory 110 can be implemented using an integrated circuit, e.g., a system-on-chip. Similarly, any of target device 150, the second network controller 140, and/or target memory 160 can be implemented on a single chip.

Processors 108 and 158 can execute instructions from one or more software programs that manage multiple processes 102 and 152, SQs 104 and 154, RQs 105 and 155, CQs 106 and 156, and the like. For example, software program(s) running on requestor device 101 can include host or client processes, a communication stack, and a driver that mediates between requestor device 101 and first network controller 120. The software program(s) can register direct channels of communication with respective memory devices, e.g., RDMA software programs running on requestor device 101 can register a direct channel of communication between the first network controller 120 and requestor memory 110 (and, similarly, a direct channel of communication between the second network controller 140 and target memory 160). Registered channels 116 and 148 can then be used to support direct memory accesses to the respective memory devices. In the course of RDMA operations, the software program(s) can post WRs, repeatedly check for completed WRs, and balance workloads among the multiple RDMA operations, balance workload between RDMA operations and non-RDMA operations (e.g., computations and memory accesses), and so on.

RDMA accesses to requestor memory 110 and/or target memory 160 can be performed via network 130, bus 114 on the requestor side, and bus 146 on the target side and can be enabled by the Converged Ethernet (RoCE) protocol, iWARP protocol, and/or InfiniBand™ TCP, and the like.

As disclosed in more detail below, RDMA accesses can be facilitated using one or more types of unified operations described herein. In some embodiments, the unified operations can use one or more of arrival indicators 164 that can be set in target memory 160. For example, a counting-WRITE operation can initialize a counter 166 that counts arrival of memory units at target memory 160. Initializing counter 166 may include starting a new counter, setting the value stored in the new or existing counter to zero (or any other suitable value), reading a current value stored in the counter without resetting the counter or perform any other suitable initialization of counter 166. As another example, a flagged-WRITE operation can set an arrival flag 168 once all units of the data have arrived. As yet another example, an application on target device 150 can designate a certain range of memory addresses of target memory 160 as arrival indicator-bound addresses 170 (e.g., using key-address entries in a key-value memory access table, as described above), such that a memory operation that stores data at one or more of those addresses causes a counter 166 (or, in some embodiments, arrival flag 168) to be initiated (or set upon the transfer of the data). Correspondingly, instead of a legacy double-stage operation (e.g., a WRITE/WRITE pair, a WRITE/ATOMIC pair, or a WRITE/SEND pair), the first network controller 120 can use a single WRITE operation to deliver data to the second network controller 140. The second network controller 140 can identify the destination address for the data as one of arrival indicator-bound addresses 170, and can generate a local request 141 that calls for a unified WRITE operation. In some embodiments, upon identifying that the destination address is one or indicator-bound addresses 170, the second network controller 140 may generate a legacy WRITE/WRITE, WRITE/ATOMIC, or WRITE/SEND local request pair (e.g., in the instances of the local bus connection between the second network controller 140 and target memory 160 not supporting unified operations). Upon receiving local request 141, target memory 160 can initialize counter 166 and update counter 166 as the units of data are being stored in target memory 160. Alternatively, target memory 160 can set an arrival flag 168 after an expected number of the units of the data have been stored.

Figure 2A:
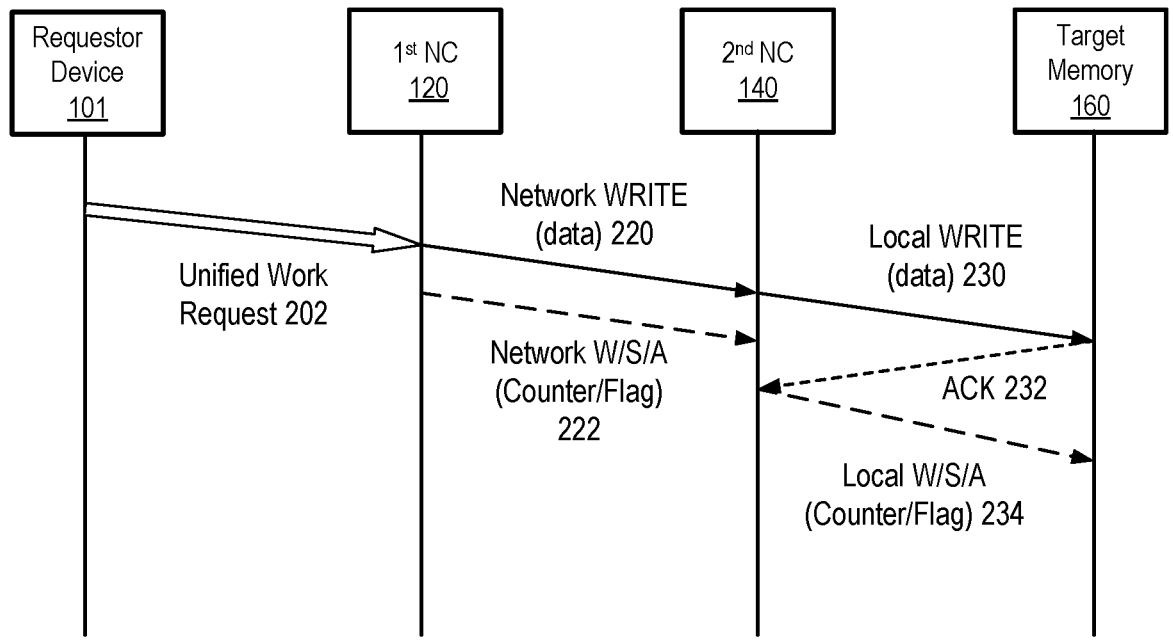
FIGS. 2A-B illustrate example RDMA operations where a requestor device and a requestor network controller natively support unified RDMA operations, according to at least one embodiment.
Figure 2B:
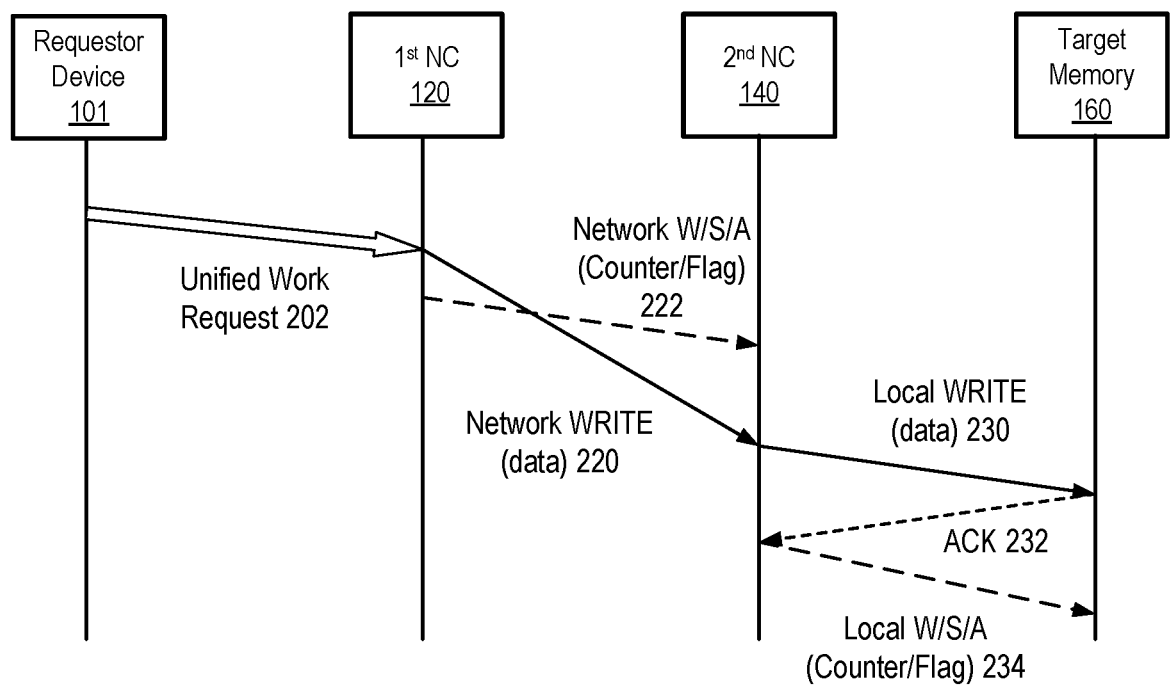

FIGS. 2A-B illustrate example RDMA operations where a requestor device and a requestor network controller natively support unified RDMA operations, according to at least one embodiment. As illustrated in FIG. 2A, both requestor device 101 and a first (requestor) network controller (NC) 120 can support a native unified work request 202 (native requests are depicted with open arrows throughout this disclosure). On the other hand, a second NC 140

(target NC) and target memory 160 are presumed to be legacy devices supporting conventional (two-stage) RDMA operations.

A unified work request 202 generated by requestor device 101 can be a single request having the following fields:

[OPCODE] recognizable by the first NC 120 as a unified work request to transmit data as well as to instantiate and/or update an arrival indicator on target memory 160. OPCODE can be of one of a number of types, e.g., an OPCODE that identifies unified work request 202 as a counting-WRITE work request, a flagged-WRITE work request, and the like. In particular, OPCODE may indicate to the first NC 120 that work request 202 will not be followed with a separate second work request to set an arrival flag/indicator. In some embodiments, an OPCODE of a unified work request can be a new RDMA verb not previously defined in the legacy RDMA architecture.

[DATA SOURCE ADDRESS] can specify one or more source addresses (e.g., source address 112 in FIG. 1) in requestor memory (e.g., requestor memory 110) that stores data to be transmitted. In some instances, a source address can be identified by a key, address, length tuple, e.g., with key identifying a partition in the memory, address identifying a starting memory page for storing the data, and length identifying the amount of data to be stored. In some instances, explicit data can be included in the unified work request 202 in place of the source address of the data. In some instances, the unified work request 202 can include a combination of the data and addresses (or other pointers to the data), e.g., with one part of the data explicitly included in the unified work request and another part of the data identified with one or more memory pointers.

[DATA UNIT SIZE] can specify a size of a memory unit (e.g., 4 KB, 16 KB, 64 KB, or any other suitable value) that is to be used by the counter. More specifically, the counter can be incremented each time the unit size of the data has been received and stored in target memory 160.

[DESTINATION ADDRESS] can specify one or more addresses or key-address pairs in target memory 160 (e.g., destination address 162 in FIG. 1) where the transmitted data is to be stored. In some embodiments, destination addresses for N units of data can include a starting address and N-1 offsets relative to the starting address. In some embodiments, only the starting address can be specified while the offsets are determined, as a default setting, using the DATA UNIT SIZE.

[COUNTER ADDRESS] can specify a memory address in target memory 160 where the counter is to be stored.

[COUNTER PARAMETERS] can include any optional modifiers specifying how the counter is to be updated, e.g., whether the counter is to be incremented or decremented upon receiving additional units of data; a step of counter increment/decrement, e.g., the amount by which the value stored in the counter is to be changed upon receiving each additional unit of data. In those embodiments where unified work request 202 is a flagged-WRITE unified work request, counter parameters can include a value of the arrival flag that is to be stored after all data has been stored. If no value is specified, a default value (e.g., 1 or 0) can be used as an arrival flag.

Having received unified work request 202, the first NC 120 can convert the received request into a legacy (two-stage) network request, which can be a legacy network WRITE request 220 including the data received from requestor device 101. Additionally, the first NC 120 can generate a second network request, depicted in FIG. 2 as a network W/S/A request 222, which can be a WRITE (W) request, a SEND (S) request, or an ATOMIC (A) request. The network W/S/A request 222 can specify how the counter or flag is to be initialized and/or updated in target memory 160. The first NC 120 can then transmit the network WRITE request 220 to the second NC 140 followed by the network W/S/A request 222.

The second NC 140 can receive the data and convert the received network WRITE request 220 into a local WRITE request 230 (e.g., a regular DMA request) to store the data in target memory 160. After receiving the data from the second NC 140, target memory 160 can send an acknowledgement (ACK) 232 to the second NC 140. In response to receiving ACK 232, the second NC 140 can transmit a local W/S/A request 234 to initiate the counter or set the flag in target memory 160.

FIG. 2B illustrates a situation in which network WRITE request 220 is delayed and arrives at the second NC 140 after network W/S/A request 222 has arrived (e.g., as a result of the two requests following two different network paths). To avoid the arrival indicator (counter or flag) to be prematurely placed on target memory 160, the second NC 140 can delay transmitting the local W/S/A request 234 until WRITE request 220 is received.

FIG. 2A and FIG. 2B illustrate an embodiment in which requestor device 101 and the first NC 120 support native unified RDMA work requests while the second NC 140 is a legacy device. In other embodiments, requestor device 101 may be a legacy device, while both the first NC 120 and the second NC 140 support native unified RDMA operation. In such embodiments, work requests generated by requestor device 101 can be legacy work requests while network requests generated by NC 120 can be unified network requests, which are described in more detail below in conjunction with FIG. 3A.

Figure 3A:
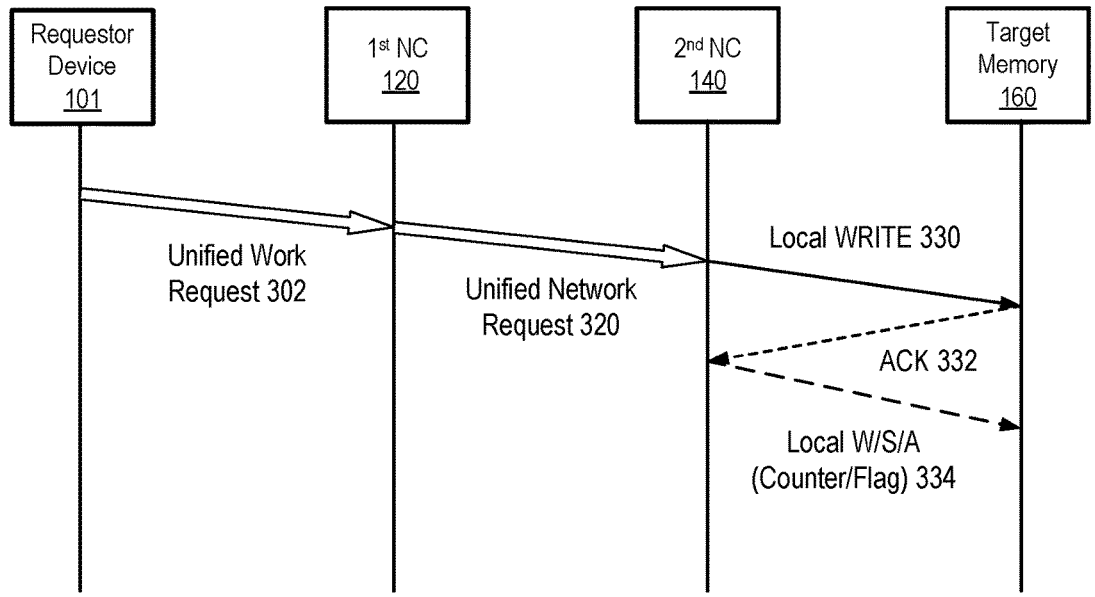
FIGS. 3A-C illustrate example RDMA operations where a requestor device, a requestor network controller, and a target network controller natively support unified RDMA operations, according to at least one embodiment.
Figure 3B:
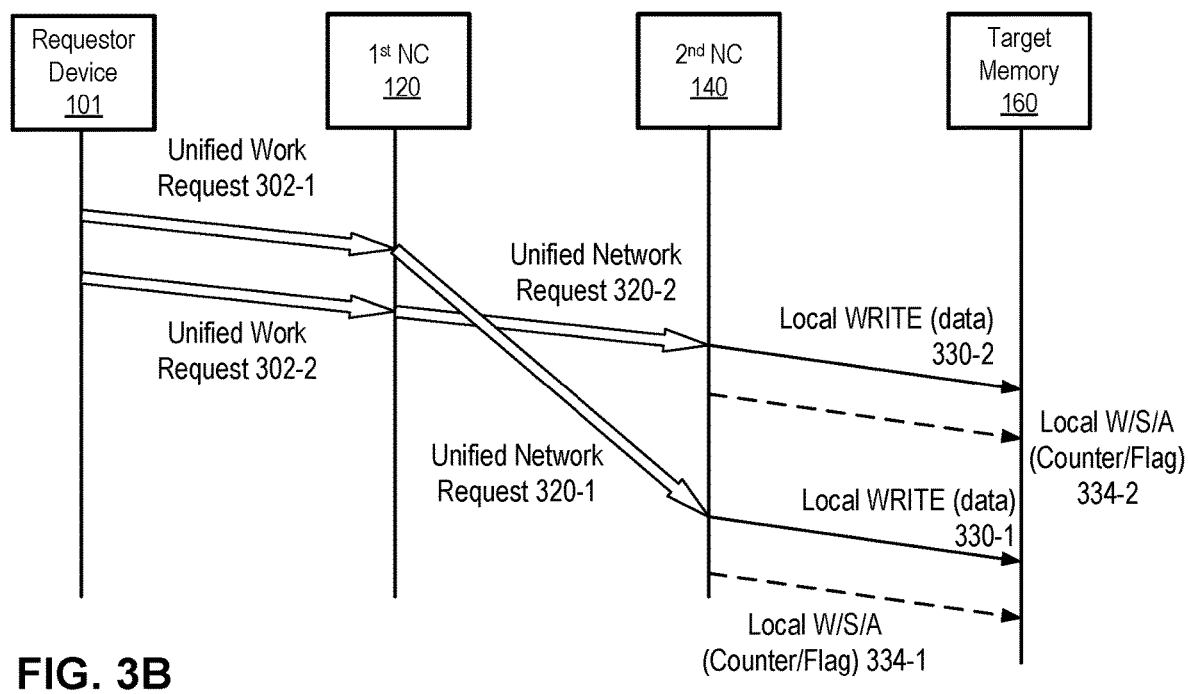
Figure 3C:
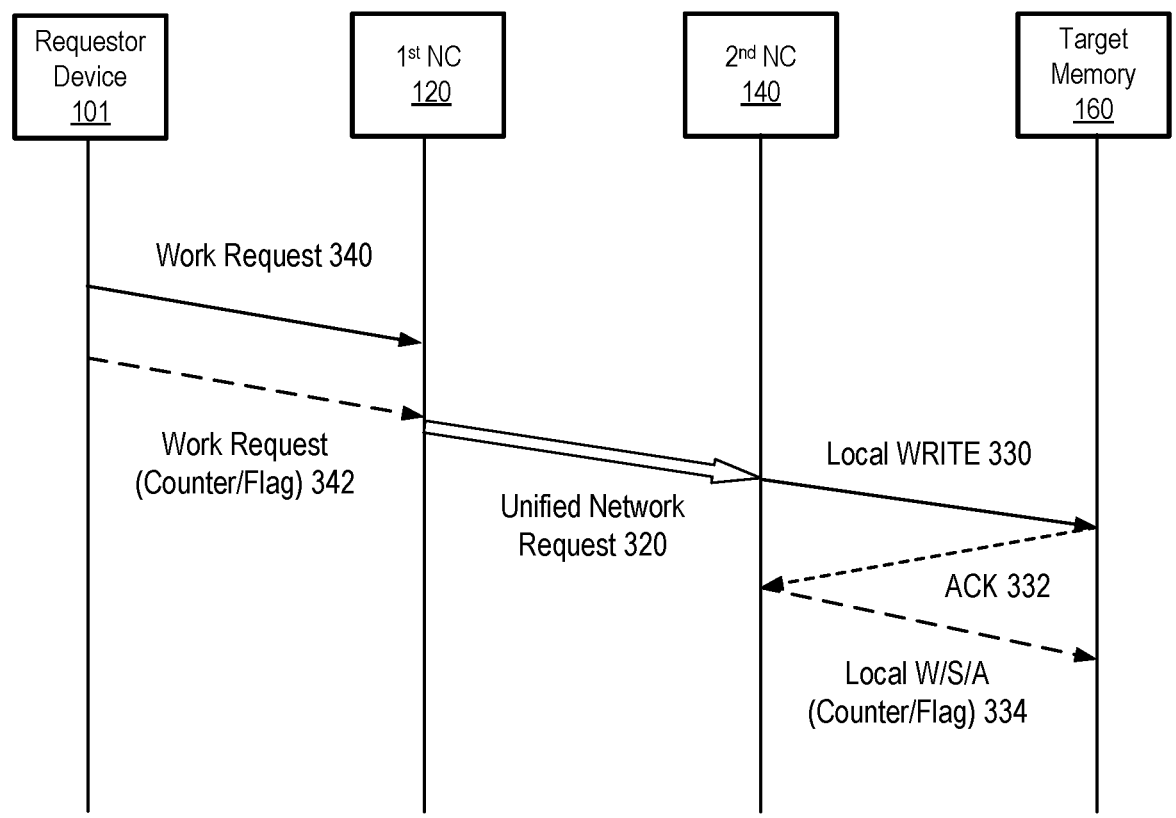

FIGS. 3A-C illustrate example RDMA operations where a requestor device, a requestor network controller, and a target network controller natively support unified RDMA operations, according to at least one embodiment. As illustrated in FIG. 3A, requestor device 101 communicates data to a first NC 120 using a unified work request 302, e.g., substantially as described in relation to FIG. 2A. Additionally, the second NC 140 can also support native RDMA transactions. In particular, having received unified work request 202 from requestor device 101, the first NC 120 can generate a unified network request 320 to transfer the received data to the second NC 140. Because target memory 160 is presumed to be a legacy device, the second NC 140 can then use a conventional (two-stage) local request to store the data in target memory 160.

Unified network request 320 generated by first NC 120 can be similar to unified work request 302 and can have the following fields:

[OPCODE] recognizable by the second NC 140 as a unified network request to transmit data as well as to instantiate and/or update an arrival indicator on target memory 160. OPCODE can identify the request as a counting-WRITE network request, a flagged-WRITE network request, an attribute-WRITE network request, and the like, substantially as described above in relation to unified work requests of FIG. 2A.

[DATA] can include the data being transmitted and previously received with unified work request 202.

[DATA UNIT SIZE] can specify the unit size whose transmission increments the counter (in those instances where the counter is initiated). This field can be the same as the corresponding field in unified work request 202.

[DESTINATION ADDRESS] can specify one or more addresses in target memory 160 (e.g., destination address 162 in FIG. 1) where the transmitted data is to be stored, which can include a starting address and one or more address offsets. This field can be the same as the corresponding field in unified work request 202.

[COUNTER ADDRESS] can specify a memory address in target memory 160 where the counter is to be stored. This field can be the same as the corresponding field in a unified work request.

[COUNTER PARAMETERS] can be any optional modifier specifying how the counter is to be updated or set. This field can be the same as the corresponding field in unified work request 202.

Having received unified network request 320, the second NC 140 can convert the received request into a legacy (two-stage) local request, which can include a legacy local WRITE request 330 (e.g., a regular DMA request), to store the received data in target memory 160. In some embodiments, after receiving the data from the second NC 140, target memory 160 can send an acknowledgement (ACK) 332 to the second NC 140. In response to receiving ACK 332, the second NC 140 can transmit a local W/S/A request 334 to initiate the counter or set the flag on target device 150. W/S/A request 334 can be any one of a local WRITE, a SEND or an ATOMIC request. In some embodiments, e.g., in PCIe® connections, no acknowledgement is sent to the second NC 140 and the first NC 120 may rely on transaction ordering rules. In some embodiments, the first NC 120 may use a subsequent READ operation (or some other flushing operation) to verify that the data has been received by the second NC 140.

FIG. 3B illustrates a situation in which multiple WRITE transactions are performed using the example embodiment of FIG. 3A. As illustrated, two unified write requests 302-1 and 302-2 are used to communicate data from requestor device 101 to the first NC 120 and two respective unified network requests 320-1 and 320-2 are used to communicate the data from the first NC 120 to the second NC 140. Unified request 320-1 can be delayed during network transmission (e.g., due to multipath propagation) and can arrive at the second NC 140 after arrival of unified request 320-2. Because instructions to transmit a given data and to establish an arrival indicator for that data arrive as part of a respective unified network request 320-n, the second NC 140 can process each request independently, as soon as the respective request is received. More specifically, upon receiving unified network request 320-2, the second NC 140 can generate a pair of a local WRITE request 330-2 to store the data in target memory 160 and an additional local S/W/A request 334-1 to establish a counter (or flag) arrival indicator for the data. Similarly, after receiving unified network request 320-1, the second NC 140 can generate a pair of a local WRITE request 330-1 to store the received data in target memory 160 and an additional local S/W/A request 334-2 to establish a counter for this data. (Additional acknowledgements that target memory 160 can communicate after each local WRITE request 330-n are not shown, for conciseness.)

Processing of multiple requests illustrated in FIG. 3B has substantial benefits over the existing techniques. For example, in existing implementations, when multiple pairs of legacy requests (e.g., write data+establish counter) are received by the requestor NC, different requests within each pair can arrive in an arbitrary order, creating a need for reordering. Similarly, data and counter/flag requests belonging to a given pair of requests can also arrive out of order. To address this problem and ensure that the data in each pair is communicated by the target NC to the target memory before the request to establish (or update) a respective counter is transmitted, the existing systems can deploy a collection buffer (on the second NC 140) to collect the incoming requests, and process data transfers only after a complete pair associated with a particular request has been received in the buffer. In the absence of such a buffer, proper ordering of the requests can be enforced using acknowledgments at earlier stages of transmission For example, the requestor NC can communicate a counter request of each pair to the target NC only after an acknowledgment indicating a successful transfer of the corresponding data has been received from the target NC. As a result, an additional hardware (collection buffer) or an additional latency (from waiting for additional acknowledgments) is incurred.

In contrast, embodiments of the present disclosure, e.g., as illustrated in FIG. 3B, ensure automatic ordering of requests within each pair and reduce latency without additional hardware.

For conciseness and ease of illustration, FIG. 3B depicts two RDMA transactions, but it should be understood that any number of transactions can be processed out of order by second NC 140 (and/or, similarly, by first NC 120) compared with the order of issued work requests.

FIG. 3C illustrates a situation in which a legacy work request is used with a unified network request. More specifically, a requestor device 101 may be a legacy device that does not support unified work request(s) 302 described in conjunction with FIG. 3A. In the instances where first NC 120 supports unified network requests, requestor device 101 may transmit a first legacy work request, e.g., work request 340, which communicates data to first NC 120. Additionally, the first NC 120 can transmit a second network request, e.g., work request 342, which can be a WRITE request, a SEND request, or an ATOMIC request. Work request 342 can specify how the counter or flag is to be initialized and/or updated in target memory 160. Having received both work requests 340 and 342, the first NC 120 can generate unified network request 320, e.g., as described above in conjunction with FIGS. 3A-C.

Figure 4A:
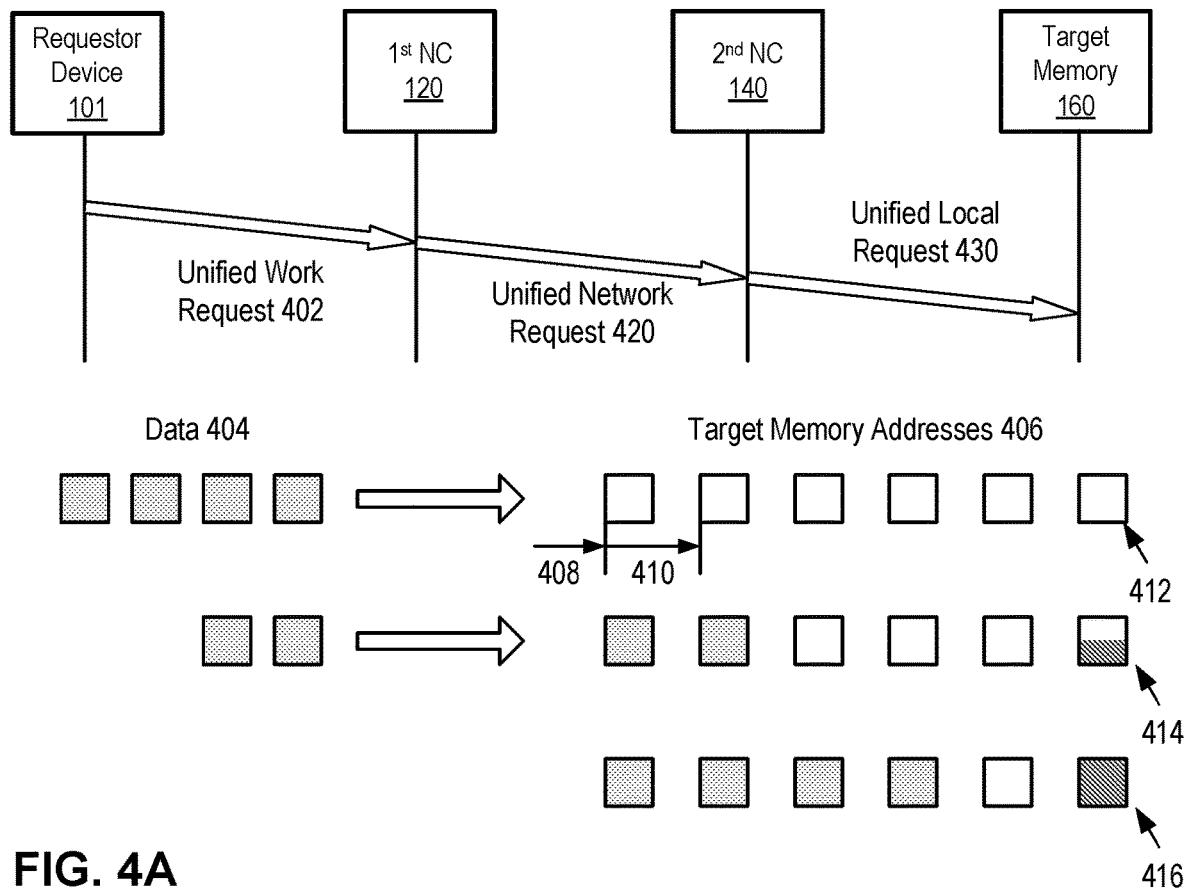
FIGS. 4A-B illustrate example RDMA operations where all communicating devices provide native support of unified RDMA requests, according to at least one embodiment.
Figure 4B:
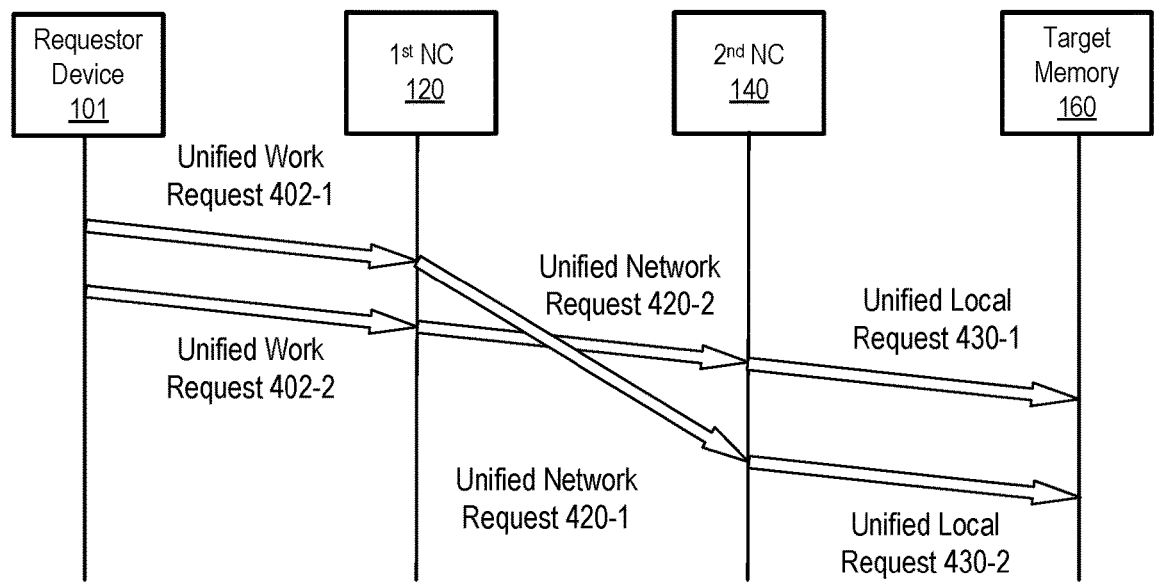

FIGS. 4A-B illustrate example RDMA operations where all communicating devices provide native support of unified RDMA requests, according to at least one embodiment. As illustrated in FIG. 4A, requestor device 101 communicates data to a first NC 120 using a unified work request 402, e.g., substantially as described in relation to FIG. 2A. The first NC 120 uses a native network request 420 to communicate the data to the second NC 140, e.g., substantially as described in relation to FIG. 3A. The second NC 140 can then transmit a unified local request 430 to target memory 160 to store the data in target memory 160.

Unified local request 430 generated by second NC 140 can be similar to unified network request 420 and can have the following fields:

[OPCODE] recognizable by the target memory 160 as a unified local request to store the transmitted data as well as to establish (e.g., instantiate and/or update) an arrival indicator on target memory 160. OPCODE can identify the request as a counting-WRITE network request, a flagged-WRITE network request, an attribute-WRITE network request, and the like, substantially as described above in relation to unified work requests of FIG. 2A and unified network requests of FIG. 3A. In some embodiments, the attribute-WRITE network request may be a legacy WRITE network request that identifies (e.g., via a key to a key-value entry of a memory access table of the target device or in some other way) the destination address as an address with an attribute that causes an arrival indicator to be set when data is stored therein.

[DATA] can include the data being transmitted and previously received by the second NC 140 with the network request (which can be a unified network request or a legacy network request).

[DATA UNIT SIZE] can specify the unit size whose transmission increments the counter (in those instances where the counter is initiated). This field can be similar to the corresponding field in a unified work request and/or a unified network request.

[DESTINATION ADDRESS] can specify one or more addresses in target memory 160 (e.g., destination address 162 in FIG. 1) where the transmitted data is to be stored, which can include a starting address and one or more address offsets. This field can be similar to the corresponding field in a unified work request and/or a unified network request.

[COUNTER ADDRESS] can specify a memory address in target memory 160 where the counter is to be stored. This field can be similar to the corresponding field in a unified work request and/or a unified network request.

[COUNTER PARAMETERS] can be any optional modifier specifying how the counter is to be updated or set. This field can be similar to the corresponding field in a unified work request and/or a unified network request.

Having received unified network request 420, the second NC 140 can convert the received request into a unified local request 430, which can include data 404, as illustrated schematically in FIG. 4A. Unified local request 430 can also include one or more target memory addresses 406. In some embodiments, the addresses can include a starting address 408 and an offset 410. The offset 410 can be determined based on the size of a unit of data. Additionally, unified local request 430 can identify an address for a counter 412 (or an arrival flag). As depicted schematically in FIG. 4A, a value stored in counter 412 can change (increase or decrease) each time a unit of data is stored at a corresponding target memory address. Value 414 is stored in counter 412 after some of the memory units (denoted with shaded squares) have been received and stored. Final value 416 is stored in counter 412 after all data has been stored. Any user or consumer of the data 404 (e.g., any computing device, an application, or a process) having access to target memory 160 can (e.g., periodically) poll the counter until the counter reaches the known final value (corresponding to an expected number of arrived units of data).

In embodiments where the first network controller 120 does not support native unified network requests, the first network controller 120 can generate and transmit a legacy two-stage request of FIG. 2A, which includes network WRITE request 220 and network W/S/A request 222. Having received the legacy two-stage request, second NC 140 can generate unified local request 430.

FIG. 4B illustrates a situation in which multiple unified RDMA transactions are performed using the example embodiment of FIG. 4A. As illustrated, two unified work requests 402-1 and 402-2 are used to communicate data from requestor device 101 to the first NC 120, two unified network requests 420-1 and 420-2 are used to communicate the data from the first NC 120 to the second NC 140, and two unified local requests 430-1 and 430-2 are used to communicate the data from the second NC 140 to target memory 160. Any two requests between the same actors in FIG. 4B can be performed in an arbitrary order, since each request includes both data and specifics of setting the arrival indicators for the data. The requests shown in FIG. 4B can reference different counters or the same (common) counter. For example, unified work requests 402-1 and 402-2 (as well as the downstream requests) can be used to communicate portions of the same data that is valid provided that both portions have arrived. In such instances, the data is determined as valid when the counter reaches the value 2 N, where N is the number of units of data in each portion of the data. The order of arrival of each of the 2 N units of data can be arbitrary.

Although FIG. 4B illustrates a situation where reordering of the data occurs as a result of external network conditions, e.g., with different paths of network transmission having different latency, time of transmission, and the like, FIG. 4B should also be understood as illustrating a situation where reordering of the data occurs intentionally by any of the intermediate actors (such as the first NC 120 and/or the second NC 140).

Figure 5A:
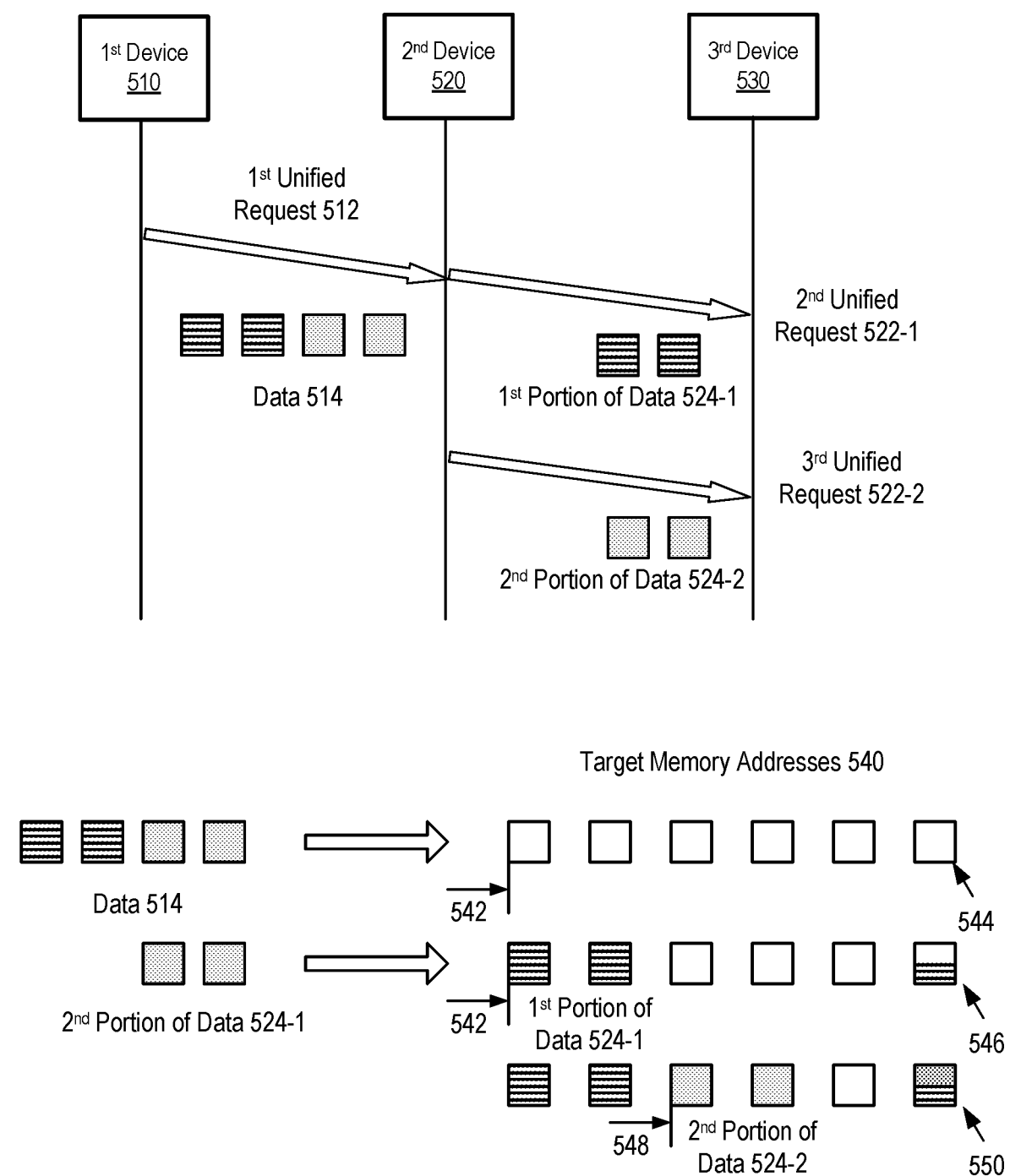
FIG. 5A illustrates splitting of a unified RDMA transaction into multiple unified RDMA transactions, according to at least one embodiment.

FIG. 5A illustrates splitting of a unified RDMA transaction into multiple unified RDMA transactions, according to at least one embodiment. Splitting (fragmenting) of RDMA transactions may be used, e.g., when the size of the data included in the work request is larger than the size of the maximum transfer unit (MTU) for the transmission over network 130, or, similarly, when the size of the network MTU is larger than the size of the local target bus MTU. As illustrated in FIG. 5A, a first device 510 communicates data 514 to a second device 520 using a first unified request 512. The second device 520 splits data 514 into a first portion of data 524-1 and a second portion of data 524-2 and communicates the first portion of data 524-1 to a third device 530 using a second unified request 522-1 and also communicates the second portion of data 524-2 to the third device 530 using a third unified request 522-2. The first device 510 can be any suitable device described in conjunction with FIGS. 1-4, e.g., requestor device 101, the first NC 120, and the like. The second device 520 can similarly be any suitable device described in conjunction with FIGS. 1-4, e.g., the first NC 120, the second NC 140, and the like. The third device 530 can likewise be any suitable device described in conjunction with FIGS. 1-4, e.g., the second NC 140, target memory 160, and the like. Correspondingly, the first unified request 512, the second unified request 522-1, and the third unified request 522-2 can be any suitable unified requests described in conjunction with FIGS. 1-4, e.g., unified work requests, unified network requests, unified local requests, or any suitable combination thereof.

In some embodiments, the first unified request 512 can include one or more target memory addresses 540, e.g., a first starting address 542 to store data 514. The second unified request 522-1 can include the same first starting address 542 to store the first portion of data 524-1. (In some embodiments, the first starting address can be different.) The third unified request 522-2 can include a different starting address, e.g., a second starting address 548, to store the second portion of data 524-2. For example, if data 514 includes 2 N units, second starting address 548 can be offset relative to first starting address 542 by N units.

Additionally, the first unified request 512, the second unified request 522-1, and the third unified request 522-2 can reference the same counter 544. As depicted schematically in FIG. 5A, a value stored in counter 544 can change (e.g., increase or decrease) each time a unit of data is stored at a corresponding target memory address. After the first portion of data 524-1 is stored in the target memory, a value 546 stored in counter 544 can indicate the arrival of N blocks of data. Similarly, after the second portion of data 524-2 is stored in the target memory, a value 550 is stored in counter 544 and can indicate arrival of all 2 N blocks of data 514. This can signal to any user or consumer of data 514 (e.g., any computing device, an application, or a process) that valid data 514 is now stored in the target memory.

Figure 5B:
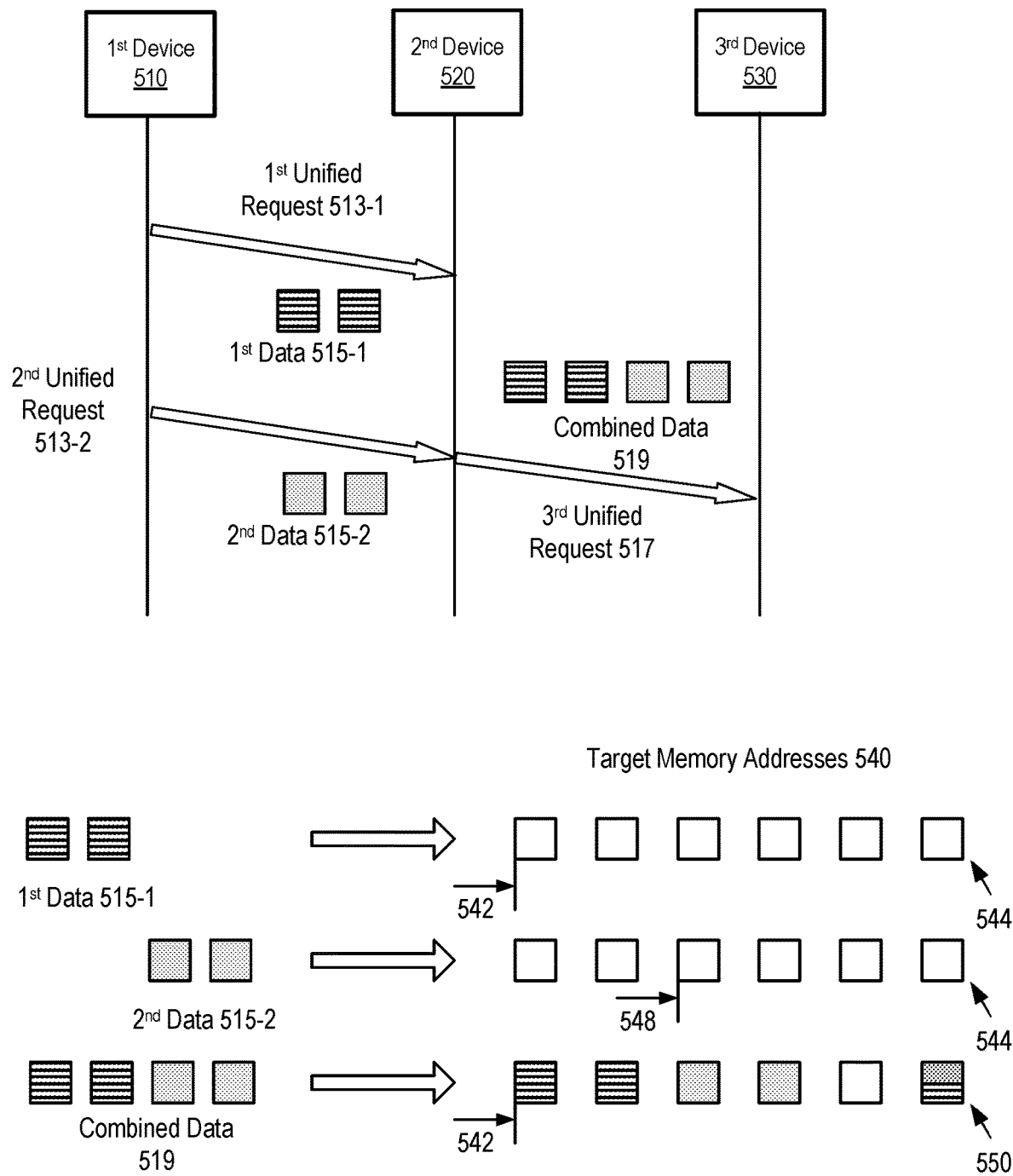
FIG. 5B illustrates combining multiple unified RDMA transactions into a single unified RDMA transaction, according to at least one embodiment.

FIG. 5B illustrates combining multiple unified RDMA transactions into a single unified RDMA transaction, according to at least one embodiment. Combining (aggregating) of RDMA transactions may be used, e.g., when the size of the data included in the work request is smaller than the size of the network MTU, or, similarly, when the size of the network MTU is smaller than the size of the local target bus MTU. As illustrated in FIG. 5B, a first device 510 communicates, to a second device 520, a first data 515-1 using a first unified request 513-1 and a second data 515-2 using a second unified request 513-2. The second device 520 combines the first data 515-1 and the second data 515-2 and communicates a combined data 519 to a third device 530 using a third unified request 517. Similarly to FIG. 5A, the first device 510, the second device 520, and the third device 530 can be any suitable devices described in conjunction with FIGS. 1-4. Likewise, the first unified request 513-1, the second unified request 513-2, and the third unified request 517 can be any suitable unified requests described in conjunction with FIGS. 1-4.

In some embodiments, the first unified request 513-1 can include one or more target memory addresses 540, e.g., a first starting address 542 to store the first data 515-1. The second unified request 513-2 can include a second starting address 548 to store the second data 515-2. For example, if the first data 515-1 includes N units, the second starting address 548 can be offset relative to the first starting address 542 by N units. The third unified request 517 can include the same first starting address 542 for the combined data 519. (In some embodiments, the starting address for the combined data 519 can be different from the first starting address 542.)

Additionally, the first unified request 513-1, the second unified request 513-2, and the third unified request 522-2 can reference the same counter 544. As depicted schematically in FIG. 5B, a value stored in counter 544 can change (e.g., increase or decrease) each time a unit of data is stored at a corresponding target memory address. After combined data 519 is stored in the target memory, a value 550 stored in counter 544 can indicate the arrival of 2 N blocks of data. This can signal to any user or consumer (e.g., any computing device, an application, or a process) that valid first data 515-1 and valid second data 515-2 are now stored in the target memory. In the embodiments that use unified flagged-WRITE operations, combining multiple unified RDMA transactions into a single unified RDMA transaction may be performed similarly as described above with the common arrival indicator signaling the arrival of the data from each combined RDMA transaction.

Figure 6A:
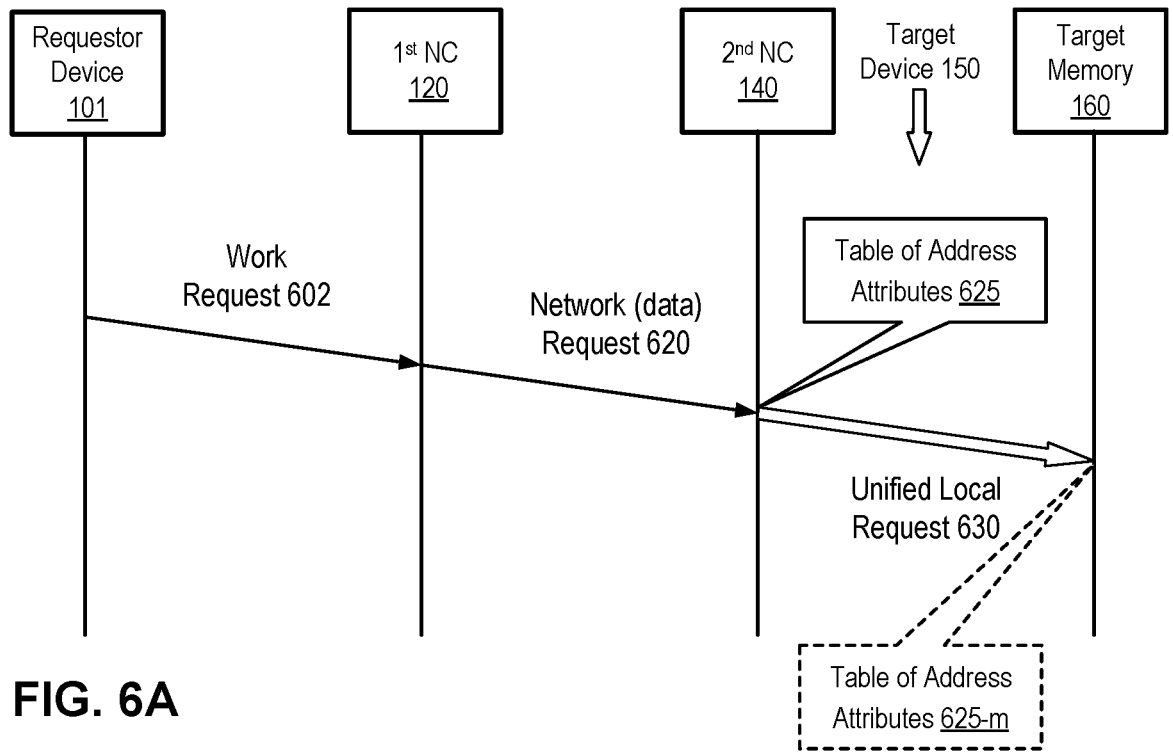
FIGS. 6A-B illustrate an example embodiment of unified attribute-WRITE RDMA transactions, according to at least one embodiment.
Figure 6B:
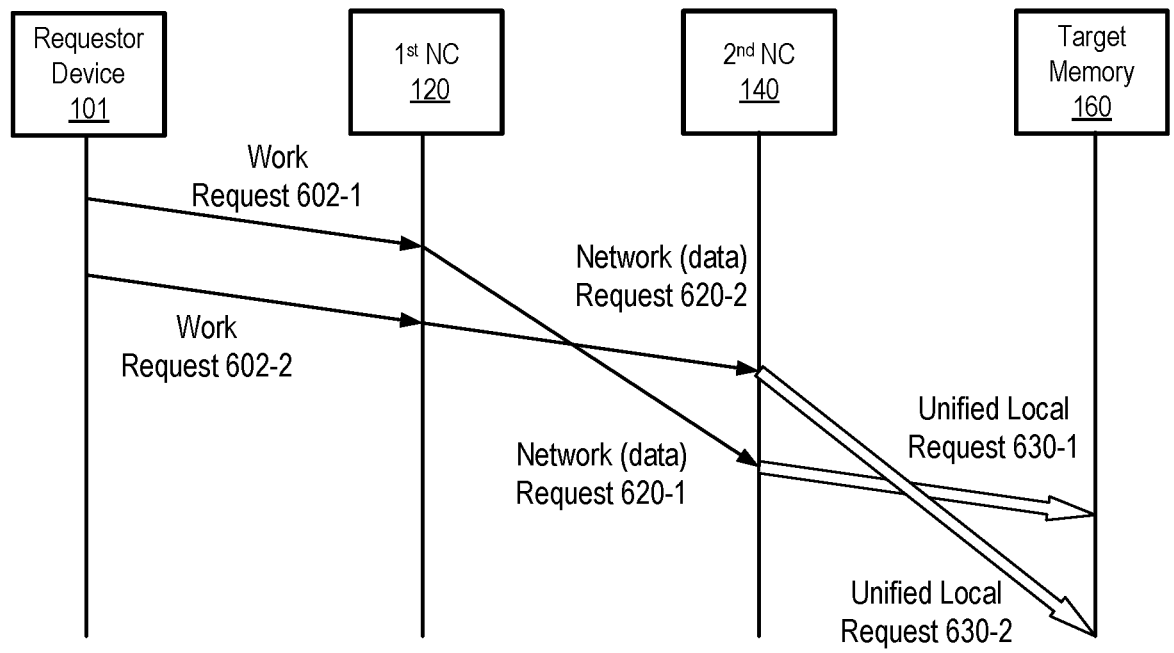

FIGS. 6A-B illustrate an example embodiment of unified attribute-WRITE RDMA transactions, according to at least one embodiment. Attribute-WRITE RDMA operations can include one or more legacy WRITE operations. More specifically, as illustrated in FIG. 6A, requestor device 101 can generate a legacy work request 602 to transmit data to a first NC 120. The work request 602 can reference a destination address on target memory 160 that has previously been registered by target device 150 as having an arrival indicator attribute that causes target memory 160 to establish an arrival indicator (e.g., a counter or a flag) when a remote requestor device stores data at one of these destination addresses. Requestor device 101 can be cognizant of the registered arrival indicator-bound memory addresses, e.g., via a table of address attributes 625, which may be provided by target device 150 to the second network controller 140 and/or target memory 160. Correspondingly, when work request 602 is generated, requestor device 101 can forgo generating an additional (legacy) WRITE, SEND, or ATOMIC request to establish an arrival indicator, since the arrival indicator is to be established in response to the arrival indicator attribute set on the requestor side.

Having received work request 602, the first NC 120 can convert the received request into a legacy network request 620. Similarly to requestor device 101, the first NC 120 can forgo generating a second network request to establish an arrival indicator. The first NC 120 can then transmit the legacy network request 620 to the second NC 140 together with the data received from requestor device 101.

The second NC 140 can receive the network request 620 and can access a table of address attributes 625 provided by target device 150 and can determine that the destination address referenced in the network request 620 belongs to the set of destination addresses that trigger initializing an arrival counter on target memory 160. In some embodiments, table of address attributes 625 can be implemented as a key-value memory access table with memory addresses stored as values. An address value (or a range of addresses) indexed by key can be stored as an entry in the key-value memory access table together with an instruction (arrival indicator attribute) that causes the arrival counter (or some other indicator) to be established once the data has been written to address (or the range of addresses). Consequently, the second NC 140 can generate a unified local request 630 that includes the data received from the first NC 120, the destination address, and an OPCODE that identifies that the operation to be performed includes initializing an arrival indicator, e.g., a counter to count units of the data or a flag to indicate arrival of the data. The unified local request 630 can further include an address for the arrival indicator in target memory. The address for the arrival indicator can also be listed in the table of address attributes 625, which can store each destination address (e.g., each starting address) in association with a respective address for the arrival indicator. The second NC 140 can use a unified local request 630 to store the data in the destination address of target memory 160. Having received the unified local request 630, target memory 160 can also establish the arrival indicator. In those instances where the unified local request 630 is a counting-WRITE local request, the arrival indicator can be a counter that is incremented (decremented) upon receiving each unit of the data. In those instances where the unified local request 630 is a flagged-WRITE local request, the arrival indicator can be an arrival flag that is set after all the data has arrived. In some embodiments, e.g., when the local bus connection between the second network controller 140 and target memory 160 does not support unified operations, the second network controller 140 can generate a legacy local request to write the data, e.g., a WRITE/WRITE, WRITE/ATOMIC, or WRITE/SEND local request pair.

FIG. 6B illustrates a situation in which multiple memory-attribute unified RDMA transactions are performed using the example embodiment of FIG. 6A. As illustrated, two (or more) legacy requests 602-1 and 602-2 (e.g., WRITE requests) are used to communicate two sets of data from requestor device 101 to the first NC 120, two legacy network requests 620-1 and 620-2 are used to communicate the data from the first NC 120 to the second NC 140, and two unified local requests 630-1 and 630-2 are used to communicate the data from the second NC 140 to target memory 160. Because no instruction to establish counter(s) on target memory 160 is communicated from the requestor side, any two (or more) requests between the same actors in FIG. 6B can be generated and executed in an arbitrary order, since each unified local request 630-1 or 630-2 causes both the data and the respective arrival indicator to be stored in target memory 160. The unified local requests 630-1 and 630-2 can reference different counters or the same (common) counter. For example, the same counter can be established if network requests 620-1 and 620-2 (as well as the downstream requests) are used to transmit portions of the same data that is valid, provided that both portions have arrived (e.g., when the counter reaches the value 2 N, where N is the number of units of data in each portion of the data).

Figure 7:
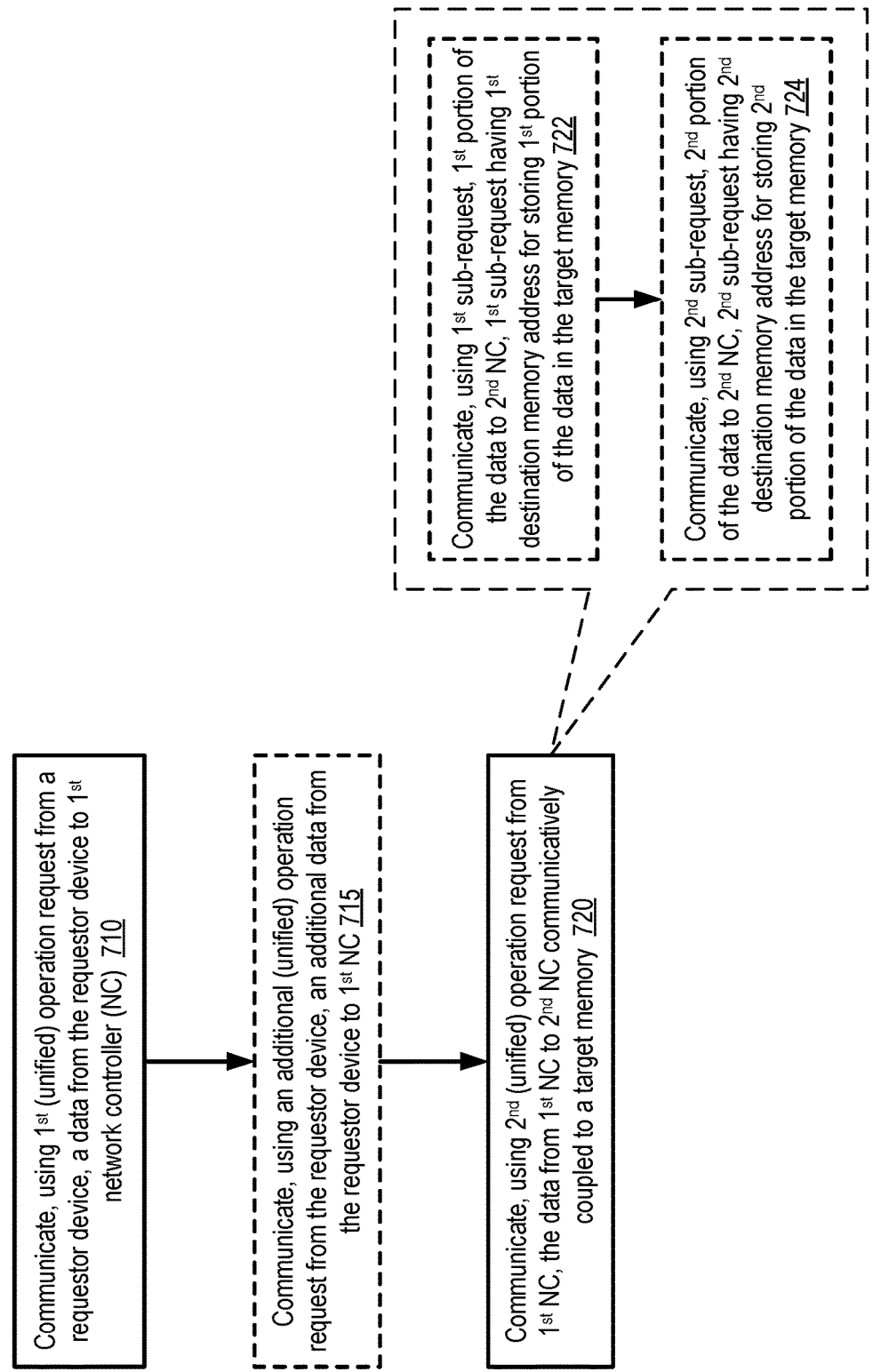
FIG. 7 is a flow diagram of an example method of facilitating RDMA transactions using one or more unified RDMA operations, as performed by a requesting side, according to at least one embodiment.
Figure 8:
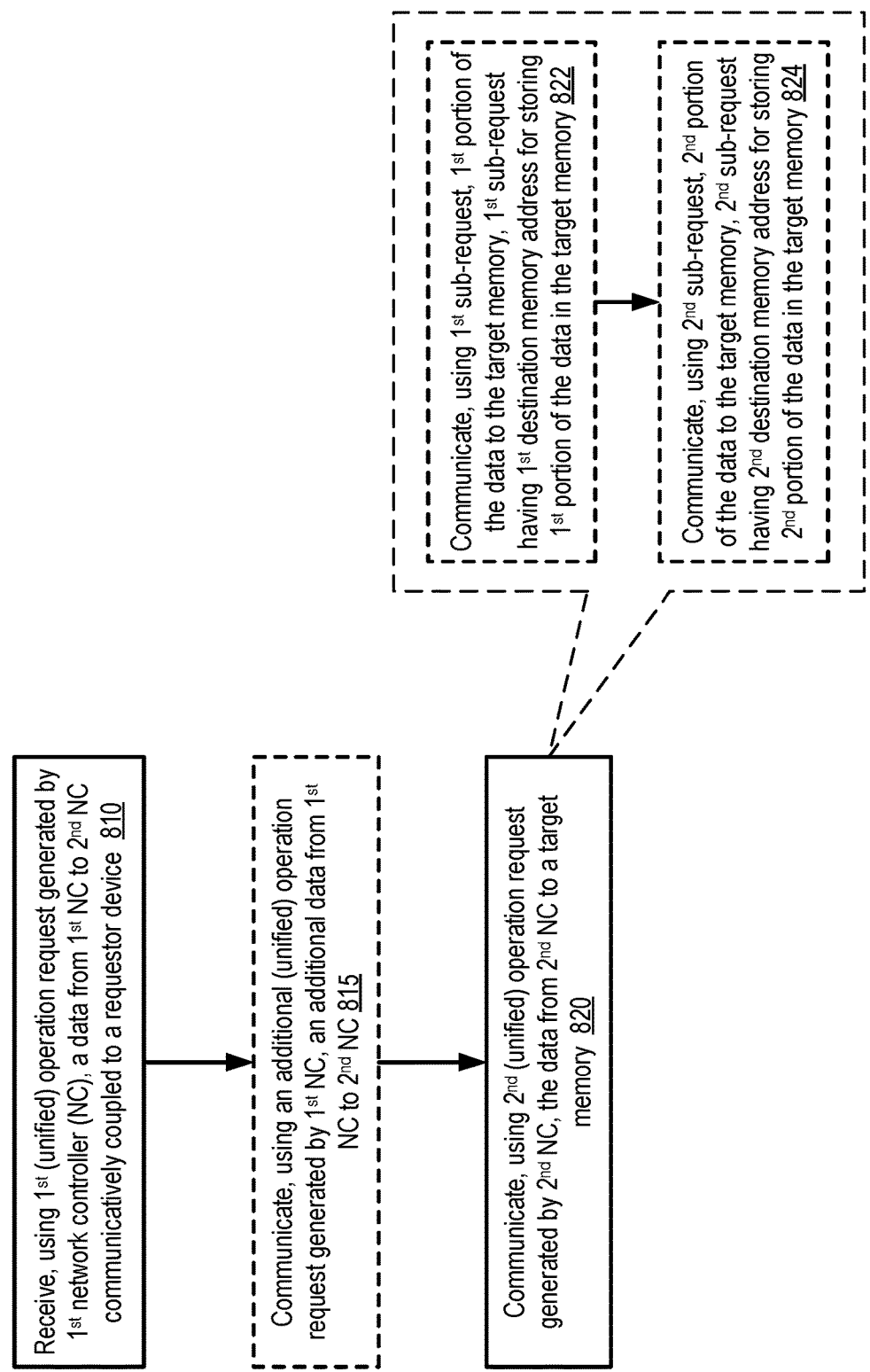
FIG. 8 is a flow diagram of an example method of facilitating RDMA transactions using one or more unified RDMA operations, as performed by a receiving side, according to at least one embodiment.
Figure 9:
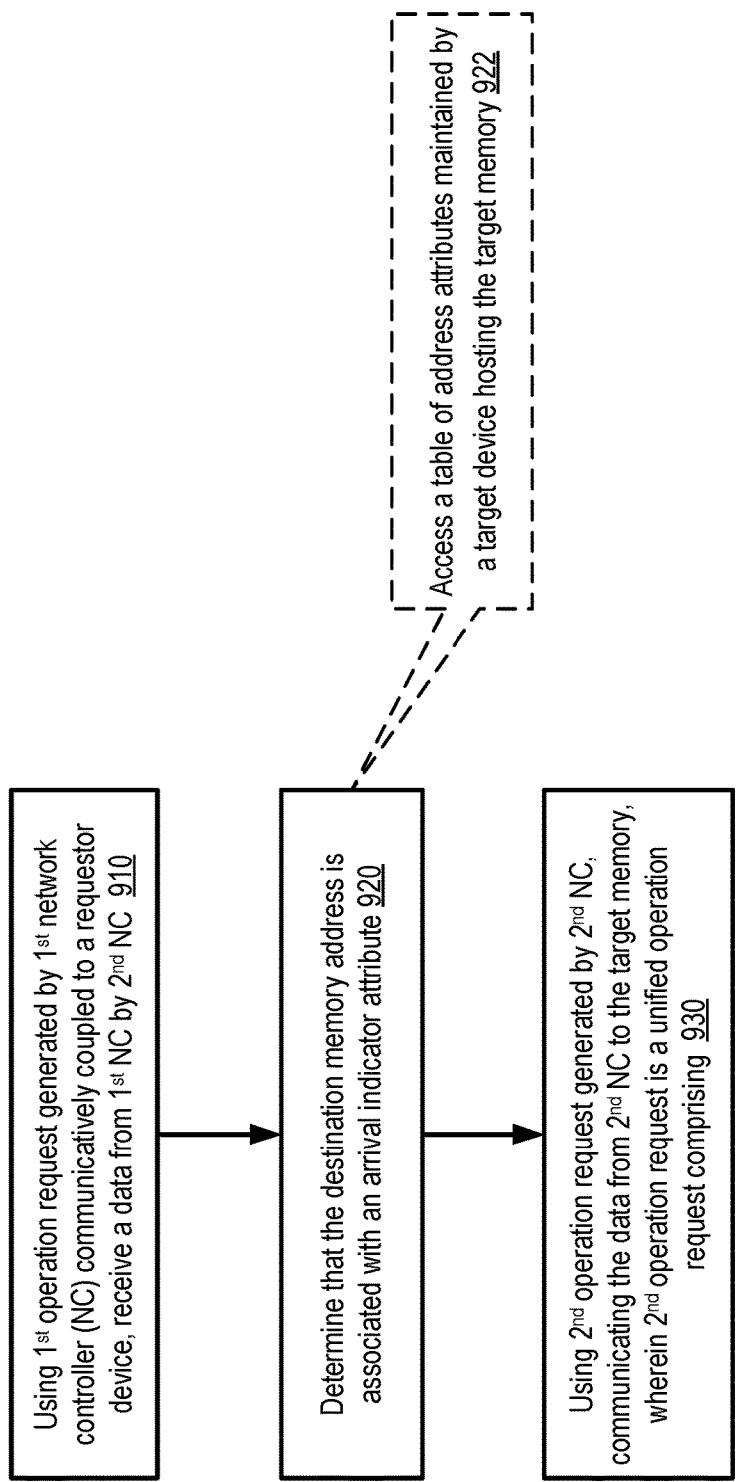
FIG. 9 is a flow diagram of an example method of facilitating RDMA transactions using arrival indicator attributes, as performed by the receiving side, according to at least one embodiment.

FIGS. 7-9 are flow diagrams of respective example methods 700-900 that facilitate unified RDMA operations between a requestor device and a target memory, according to some embodiments of the present disclosure. Method 700-900 can be performed to facilitate a memory transaction between a requestor device (e.g., requestor device 101 of FIG. 1) and a target memory (e.g., target memory 160). The requestor device can be any server, including a rack-mount server, computing node, including a cloud computing node, a desktop computer, a laptop computer, a smartphone, an edge device of a computing network, or any suitable computing device. The target memory can include a random-access memory (RAM), electrically erasable programmable read-only memory (EEPROM), or any other device capable of storing data. The target memory can be hosted by any suitable target device (e.g., target device 150 of FIG. 1), which can be a computing device of any type referenced above in relation to the requestor device. Methods 700-900 may be performed by one or more processing units (e.g., CPUs, GPUs, FPGAs, etc.) described in conjunction with FIG. 1. The processing units can include (or communicate with) one or more memory devices, e.g., different from the target memory. In at least one embodiment, methods 700-900 can be performed by multiple processing threads (e.g., CPU threads and/or GPU threads), each thread executing one or more individual functions, routines, subroutines, or operations of the method. In at least one embodiment, processing threads implementing methods 700-900 can be synchronized (e.g., using semaphores, critical sections, and/or other thread synchronization mechanisms). Alternatively, processing threads implementing methods 700-900 can be executed asynchronously with respect to each other. Various operations of methods 700-900 can be performed in a different order compared with the order shown in FIGS. 7-9. Some operations of the methods can be performed concurrently with other operations. In at least one embodiment, one or more operations shown in FIGS. 7-9 need not always be performed.

FIG. 7 is a flow diagram of an example method 700 of facilitating RDMA transactions using one or more unified RDMA operations, as performed by a requesting side, according to at least one embodiment. In some embodiments, the requesting side can include a requestor device and a requestor network controller (e.g., a first network controller 120 in FIG. 1) communicatively coupled to the requestor device. Correspondingly, some operations of method 700 can be performed by processing units of the requesting device while some operations of the method can be performed by processing units of the requestor network controller. At block 710, processing units performing method 700 can use a first operation request generated by a requestor device to communicate a data from the requestor device to a first network controller. In some embodiments, the data is communicated from the requestor device to the first network controller using a Peripheral Component Interconnect Express (PCIe®) connection, a Compute Express Link (CXL®) connection, NVLink® connection, or a chip-to-chip (C2C) connection, such as NVLink C2C connection.

At block 720, the processing units performing method 700 can use a second operation request generated by the first network controller, to communicate the data from the first network controller to a second network controller. The second network controller can be communicatively coupled to the target memory. In some embodiments, the data can be communicated from the first network controller to the second network controller using an RDMA over Convergent Ethernet connection or an InfiniBand connection. In some embodiments, the data can be communicated from the first network controller to the second network controller over a plurality of network paths.

In some embodiments, at least one of the first operation request or the second operation request can be a unified operation request. For example, the first operation request can be a unified operation request, while the second operation request can be a legacy (e.g., two-stage) operation request. In some embodiments, the first operation request can be a legacy operation request, while the second operation request can be a unified operation request. In some embodiments, each of the first operation request and the second operation request can be a unified operation request. A unified operation request can include an operand identifying the data. The identification of the data can be performed by including the actual data in the request or by identifying a source address where the data is currently stored (e.g., on requestor memory 110 in FIG. 1). The unified operation request can also include a destination memory address to store the data in the target memory. The unified operation request can further include an operation code recognizable, by a corresponding recipient device (e.g., the first network controller or the second network controller), as a request to update an arrival indicator in the target memory responsive to arrival of one or more portions of the data at the target memory. The unified operation request can also include a memory address to store the arrival indicator in the target memory.

In some embodiments, the operation code is to cause the target memory to set a value of the arrival indicator (e.g., an arrival flag) to a predetermined value responsive to all units of the data stored in the target memory. The predetermined value can be independent of a size of the data, and can be a single-bit value (e.g., value 1) or any suitable multi-bit value. In some embodiments, the operation code is to cause the target memory to modify the arrival indicator (e.g., a counter) each time a predetermined amount of the data is stored in the target memory. In some embodiments, the operation code is to cause the target memory to modify the arrival indicator using an atomic operation.

(In some embodiments, the unified operation request can include a granularity parameter. More specifically, the operation code can cause the target memory to modify the arrival indicator each time a number of memory units (e.g., 4 KB, 16 KB, 64 KB, etc.) of the data corresponding to the granularity parameter is stored in the target memory. If the granularity parameter is not included in the unified operation request, a predetermined (default) number can be used as a default granularity parameter (e.g., 4 KB or any other suitable number of bytes of the data).

In some embodiments, unified operations can be used to combine multiple (e.g., two or more) RDMA transactions into a single RDMA transaction or to split a single RDMA transaction into multiple (two or more) RDMA transactions.

For example, as indicated by optional block 715, processing units performing method 700 may use an additional operation request (e.g., second unified request 513-2 in FIG. 5B) generated by the requestor device, to communicate an additional data (e.g., second data 515-2) from the requestor device to the first network controller. More specifically, the additional operation request can include an additional destination memory address (e.g., second starting address 548) to store the additional data on the target memory, and the operand of the second operation request can identify the additional data to be stored (e.g., second data 515-2). In such instances, the second operation request (e.g., third unified request 517 in FIG. 5B) can include combined data 519 and can cause the target memory to modify the arrival indicator (e.g., counter 544) each time an amount of the data (e.g., first data 515-1) or an amount of the additional data (e.g., second data 515-2) is stored in the target memory.

As illustrated with the callout portion in FIG. 7, splitting of an RDMA transaction can be performed by generating a first sub-request (e.g., second unified request 522-1) and a second sub-request (e.g., third unified request 522-2). More specifically, communicating the data (e.g., data 514 in FIG. 5A) from the first network controller to the second network controller can include using, at block 722, the first sub-request, to communicate a first portion of the data (e.g., first portion of the data 524-1) to the second network controller. The first sub-request can include a first destination memory address (e.g., first starting address 542) to store the first portion of the data in the target memory. At block 724, method 700 can include using the second sub-request to communicate a second portion of the data (e.g., second portion of the data 524-2) to the second network controller. The second sub-request can include a second destination memory address (e.g., second starting address 548) to store the second portion of the data in the target memory. Each of the first sub-request and the second sub-request can cause the target memory to modify the arrival indicator (e.g., counter 544) each time an amount of the first portion of the data or the amount of the second portion of the data is stored in the target memory.

FIG. 8 is a flow diagram of an example method 800 of facilitating RDMA transactions using one or more unified RDMA operations, as performed by a receiving side, according to at least one embodiment. In some embodiments, the receiving side can include a target (host) device, a target memory, and a target network controller (e.g., a second network controller 140 in FIG. 1) communicatively coupled to the target memory. Correspondingly, some operations of method 800 can be performed by processing units of the target memory while some operations of the method can be performed by processing units of the target (second) network controller. At block 810, processing units may use a first operation request generated by the first network controller, to receive a data from the first network controller by the second network controller. In some embodiments, the data can be communicated from the first network controller to the second network controller using an RDMA over Convergent Ethernet connection or an InfiniBand connection. In some embodiments, the data can be communicated from the first network controller to the second network controller over a plurality of network paths.

At block 820, processing units performing method 800 can use a second operation request generated by the second network controller, to communicate the data from the second network controller to the target memory. In some embodiments, the data can be communicated from the second network controller to the target memory using a Peripheral Component Interconnect Express (PCIe®) connection, a Compute Express Link (CXL®) connection, NVLink® connection, or a chip-to-chip (C2C) connection, such as NVLink C2C connection. In some embodiments, at least one of the first operation request or the second operation request can be a unified operation request. For example, the first operation request can be a unified operation request, while the second operation request can be a legacy (e.g., two-stage) operation request. In some embodiments, the first operation request can be a legacy operation request, while the second operation request can be a unified operation request. In some embodiments, each of the first operation request and the second operation request can be a unified operation request. The unified operation request can include an operand identifying the data, e.g., the data can be explicitly included in the request. The unified operation request can also include a destination memory address to store the data in the target memory. The unified operation request can further include an operation code recognizable, by a corresponding recipient device (e.g., the second network controller or the target memory), as a request to update an arrival indicator in the target memory responsive to arrival of one or more portions of the data at the target memory. The unified operation request can also include a memory address to store the arrival indicator in the target memory. The arrival indicator can be implemented using any embodiments described above in conjunction with method 700.

In some embodiments, unified operations can be used to combine multiple (e.g., two or more) RDMA transactions into a single RDMA transaction or to split a single RDMA transaction into multiple (two or more) RDMA transactions. For example, as indicated by optional block 815, processing units performing method 700 may use an additional operation request (e.g., second unified request 513-2 in FIG. 5B) generated by the first network controller, to communicate an additional data (e.g., second data 515-2) from the first network controller to the second network controller. More specifically, the additional operation request can include an additional destination memory address (e.g., second starting address 548) to store the additional data on the target memory, and the operand of the second operation request can identify the additional data to be stored (e.g., second data 515-2). In such instances, the second operation request (e.g., third unified request 517 in FIG. 5B) can include combined data 519 and can cause the target memory to modify the arrival indicator (e.g., counter 544) each time an amount of the data (e.g., first data 515-1) or an amount of the additional data (e.g., second data 515-2) is stored in the target memory.

As illustrated with the callout portion in FIG. 8, splitting of an RDMA transaction can be performed by generating a first sub-request (e.g., second unified request 522-1) and a second sub-request (e.g., third unified request 522-2). More specifically, communicating the data (e.g., data 514 in FIG. 5A) from the second network controller to the memory address can include using, at block 822, the first sub-request to communicate a first portion of the data (e.g., first portion of the data 524-1) to the target memory. The first sub-request can include a first destination memory address (e.g., first starting address 542) to store the first portion of the data in the target memory. At block 724, method 700 can include using the second sub-request to communicate a second portion of the data (e.g., second portion of the data 524-2) to the target memory. The second sub-request can include a second destination memory address (e.g., second starting address 548) to store the second portion of the data in the target memory. Each of the first sub-request and the second sub-request can cause the target memory to modify the arrival indicator (e.g., counter 544) each time an amount of the first portion of the data or an amount of the second portion of the data is stored in the target memory.

FIG. 9 is a flow diagram of an example method 900 of facilitating RDMA transactions using arrival indicator attributes, as performed by the receiving side, according to at least one embodiment. Operations of method 900 can be performed by any devices and components described in conjunction with method 700 and/or method 800. At block 910, processing units performing method 900 can use a first operation request (generated by a first network controller) to receive a data from the first network controller by a second network controller. In some embodiments, the first operation request can include a destination memory address to store the data on the target memory.

At block 920, processing units performing method 900 can determine that the destination memory address is associated with an arrival indicator attribute. An arrival indicator attribute can include any parameter, flag, or any other attribute indicating that the memory location associated with the destination memory address is bound to an arrival indicator. More specifically, when data is being written to such a memory address, the arrival indicator is established that signals that the data has been written. As illustrated with the callout block 922 determining that the destination memory address is associated with the arrival indicator attribute can include accessing a table of address attributes (e.g., table of address attributes 625). The table of address attributes can be maintained by the target device that hosts the target memory. For example, the target device can select addresses (e.g., any portion of the target memory) that are to be associated with arrival indicators, register the selected addresses with the RDMA architecture, periodically update (add and/or remove) the selected addresses, and so on. The table of address attributes can be any table, database, listing, library, or any other resource that identifies memory addresses associated with arrival indicators.

With a continuing reference to block 920, the unified operation request can further include a memory address to store the arrival indicator in the target memory.

At block 930, method 900 can continue with processing units using a second operation request generated by the second network controller to communicate the data from the second network controller to the target memory. In some embodiments, the second operation request can include the data received from the first network controller and a destination memory address to store the data in the target memory. The unified operation request can further include an operation code recognizable, by the target memory, as a request to update an arrival indicator in the target memory responsive to arrival of one or more portions of the data at the target memory. The unified operation request can also include a memory address to store the arrival indicator in the target memory. The arrival indicator can be implemented using any embodiments described above in conjunction with method 700.

Figure 10A:
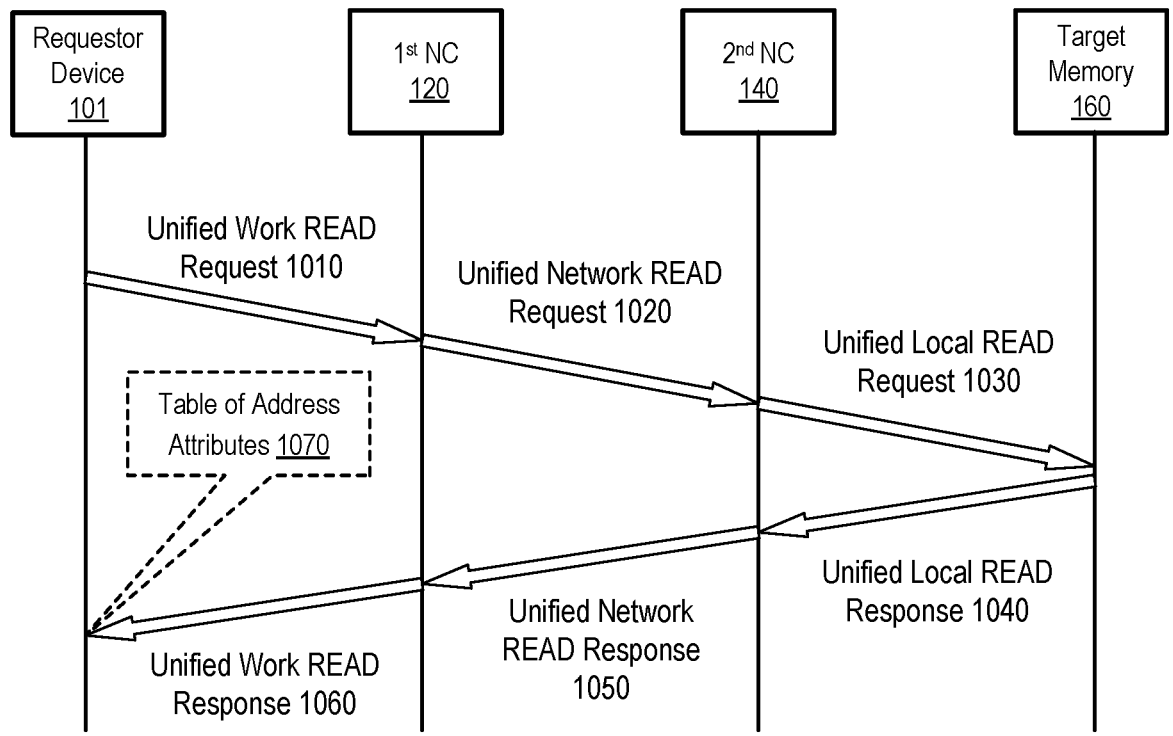
FIG. 10A illustrates example unified RDMA READ operations, according to at least one embodiment.

FIG. 10A illustrates example unified RDMA READ operations, according to at least one embodiment. Similarly to unified WRITE operations disclosed above, unified READ operations can be used to fetch data from a target memory device together with explicit or implicit instructions to set or update an arrival indicator on the receiving side upon complete receipt of the data. In some embodiments, unified READ operations can be used in conjunction with data reads from multiple target memory devices, with the arrival of the data indicated by a common counter.

As illustrated in FIG. 10A, requestor device 101 can communicate a unified work READ request 1010 to the first NC 120 to read data stored in target memory 160. Unified work READ request 1010 can be a single work request having an OPCODE recognizable by the first NC 120 as a unified work request to receive data from target memory 160 and to instantiate and/or update an arrival indicator on requestor device 101 once the data has been received by requestor device 101. Unified work READ request 1010 can further include a memory address (in target memory 160) where the data is currently stored and a destination address (e.g., in requestor memory 110 in FIG. 1) where the fetched data is to be stored. In some embodiments, any or both of the source address and the destination address can be in the form of key, address pairs (or key, address, length tuples). Unified work READ request 1010 can further include a data unit size to be used by the counter on requestor device 101, which can be incremented each time an amount of data equal to the data unit size is stored in memory of requestor device 101. Unified work READ request 1010 can also include a counter address and various counter parameters, e.g., as described above in conjunction with unified work request 202 of FIG. 2A.

Having received unified work READ request 1010 from requestor device 101, the first NC 120 can generate and transmit a unified network READ request 1020 to the second NC 140. Similarly, the second NC 140 can use a unified local READ request 1030 to target memory 160 to fetch the data from target memory 160 over a local bus (e.g., bus 146 in FIG. 1). The data can be provided from target memory 160 to the second NC 140 with a unified local READ response 1040. The second NC 140 may deliver the data over a network (e.g., network 130 in FIG. 1) to first NC 120 using a unified network READ response 1050. Similarly, the first NC 120 may deliver the data over a local connection (e.g., bus 114 in FIG. 1) to requestor device 101 (e.g., requestor memory 110).

In embodiments that use a counting-READ unified operation, unified network READ response 1050 can identify an address for a counter to be incremented on requestor device 101 (e.g., requestor memory 110) each time a data unit size is stored therein. Similarly, in the embodiments that use a flagged-READ unified operation, unified network READ response 1050 can identify an address in memory for the arrival indicator (bit, flag, etc.) to be set once all units of the data are stored on requestor device 101 (or the memory of requestor device 101).

In embodiments that use attribute-READ transactions, some of the requests 1010-1030 can be single-operation legacy READ requests and some of the responses 1040-1060 can be legacy READ responses. Work READ request 1010 and downstream requests 1020-1030 (as well as responses 1040-1060) can reference source address in target memory 160 and a destination address in a memory accessible to requestor device 101 (e.g., requestor memory 110). The destination address can be previously registered by requestor device 101 as having an associated arrival indicator attribute that causes requestor device 101 or the first NC 120 to establish an arrival indicator (e.g., a counter or a flag) when the fetched data is stored in the memory accessible to requestor device 101. Correspondingly, when work request 1010 is generated, requestor device 101 can forgo generating an additional (legacy) READ or ATOMIC request to establish an arrival indicator, since the arrival indicator is to be established in response to the arrival indicator attribute set on the requestor side. In some embodiments, an arrival indicator attribute can be set similarly to an arrival indicator attribute used in the context of attribute-WRITE operations described in conjunction with FIG. 6A. For example, a table of address attributes 1070 can be implemented as a key-value memory access table with memory addresses stored as values and indexed by keys. When a key associated with an arrival attribute is referenced in a work READ request 1010, the same key is also referenced in downstream requests 1020-1030, in local READ responses 1040, and in network READ response 1050. Responsive to receiving network READ response 1050 with the requested data and the key and determining that the key corresponds to the destination memory address associated with the arrival indicator attribute, the first NC 120 can use work READ response 1060 to store the received data in the destination memory address of requestor memory 110 (or any other memory accessible to the requestor device). Additionally, the first NC 120 can use work READ response 1060 to cause an arrival indicator to be set or updated requestor memory 110. For example, the arrival indicator can be updated each time a predetermined amount of the data is stored in the requestor memory 110.

In some embodiments, the arrival attribute can be a static attribute associated with a specific memory page or address (or a range of pages/addresses) permanently or quasi-permanently (e.g., for the duration of a work session). In some embodiments, the arrival attribute may be an attribute that is dynamically associated with the specific READ request. More specifically, execution of work READ request 1010 may cause requestor device to place a temporary arrival attribute to the address referenced in work READ request 1010 (or place the referenced address on a temporary list of memory addresses causing the arrival counter (flag, etc.) to be established when the fetched data is being written to this memory address.

Figure 10B:
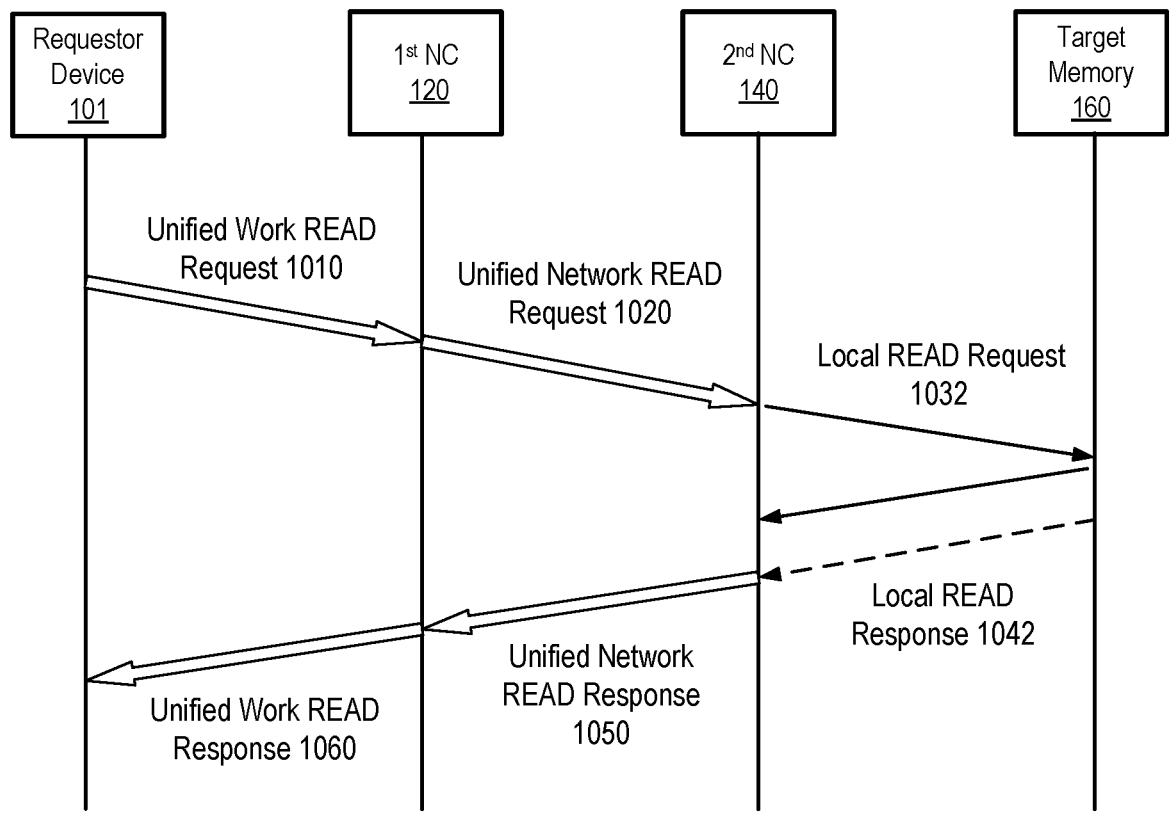
FIG. 10B illustrates example unified RDMA READ operations, in which a target memory is a legacy device, according to at least one embodiment.

FIG. 10B illustrates example unified RDMA READ operations, in which a target memory is a legacy device, according to at least one embodiment. As illustrated in FIG. 10B, unified READ operations can be used even when one or more devices are legacy devices and do not support native unified RDMA operations. For example, target memory 160 in FIG. 10B can be a legacy device. Correspondingly, having received a unified network READ request 1020 from the first NC 120, the second NC 140 can generate a legacy local READ request 1032 to target memory 160 and receive the requested data with a legacy local READ response 1042. The legacy local READ response 1042 may include a pair of transactions, e.g., a first transaction to transfer the requested data (solid arrow) and a second transaction to establish a counter (or flag) on requestor device 101. Having received local READ response 1042, the second NC 140 can combine the two transactions of the received response into a single unified network READ response 1050 to deliver the data to the first NC 120. Although FIG. 10B illustrates a situation in which only target memory 160 is a legacy device, similar operations may be performed when both target memory 160 and the second NC 140 are legacy devices. More specifically, in such instances, READ requests and READ responses between the first NC 120, the second NC 140, and target memory 160 may be legacy operations while communications between the requestor device and the first NC 120 can be unified operations. Although not shown in FIG. 10A or FIG. 10B, in some embodiments, requestor device 101 can be a legacy device, while the first NC 120 and the second NC 140 natively support unified operations. In such embodiments, work READ request transmitted by requestor device 101 can be a legacy request while the network READ request may be unified network READ request 1020. Similarly, a network READ response communicated from the second NC 140 to first NC 120 can be unified network READ response 1050 whereas a work READ response communicated from the first NC 120 to requestor device 101 (or requestor memory 110 in FIG. 1) can be a two-stage legacy response.

Figure 11:
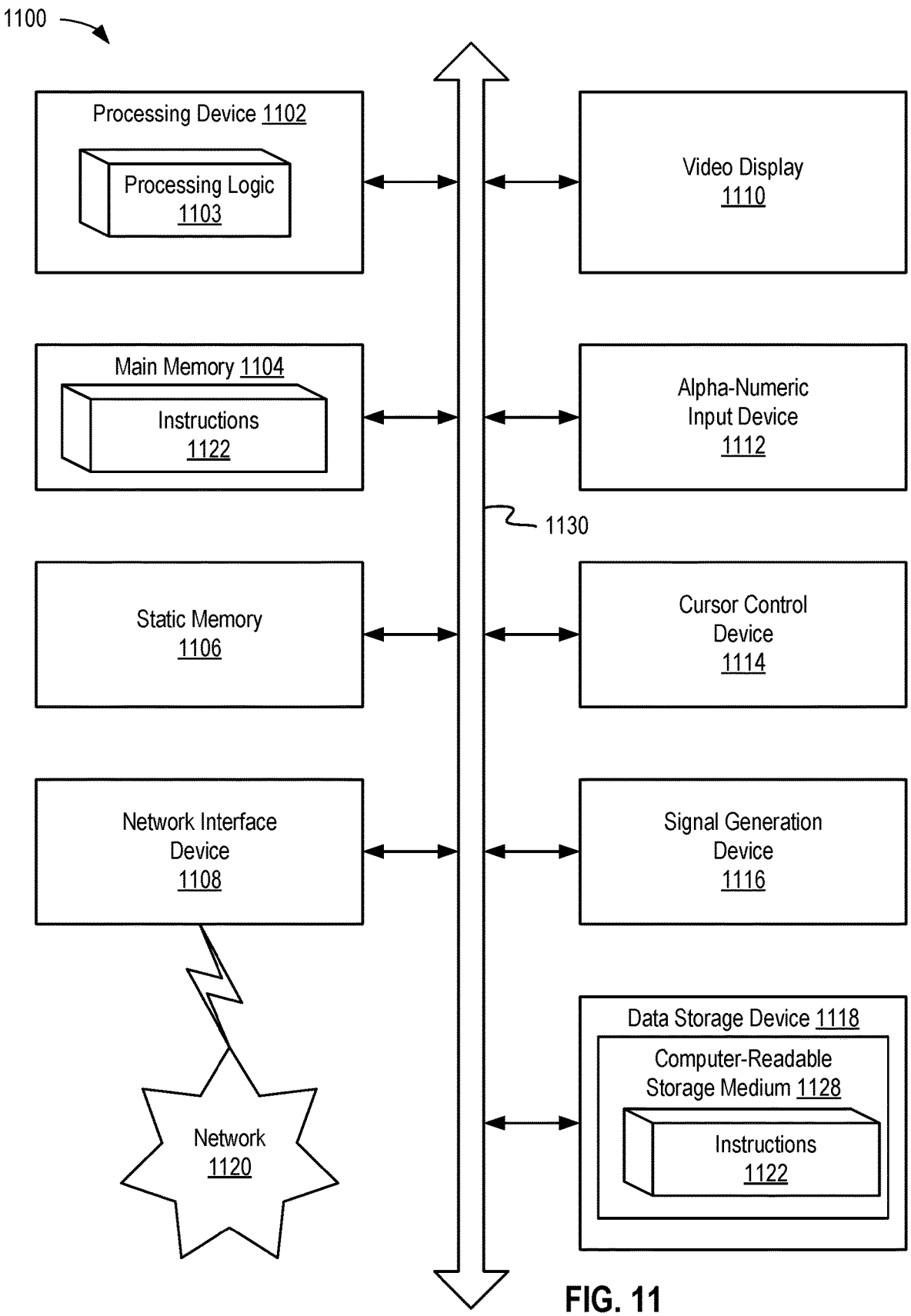
FIG. 11 depicts a block diagram of an example computer device capable of facilitating unified RDMA operations, according to at least one embodiment.

FIG. 11 depicts a block diagram of an example computer device 1100 capable of facilitating unified RDMA operations, according to at least one embodiment. Example computer device 1100 can be connected to other computer devices in a LAN, an intranet, an extranet, and/or the Internet. Computer device 1100 can operate in the capacity of a server in a client-server network environment. Computer device 1100 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1100 can include a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processing device 1102 (which can include processing logic 1103) represents one or more general-purpose processing devices such as a microprocessor, central processing unit, or the like. More particularly, processing device 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 can also be one or more special-purpose processing devices such as an ASIC, a FPGA, a digital signal processor (DSP), network processor, or the like. In accordance with one or more aspects of the present disclosure, processing device 1102 can be configured to execute instructions performing method 700 of facilitating RDMA transactions using one or more unified RDMA operations, as performed by a requesting side, method 800 of facilitating RDMA transactions using one or more unified RDMA operations, as performed by a receiving side, and method 900 of facilitating RDMA transactions using arrival indicator attributes.

Example computer device 1100 can further comprise a network interface device 1108, which can be communicatively coupled to a network 1120. Example computer device 1100 can further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 can include a computer-readable storage medium (or, more specifically, a non-transitory computer-readable storage medium) 1128 on which is stored one or more sets of executable instructions 1122. In accordance with one or more aspects of the present disclosure, executable instructions 1122 can comprise executable instructions performing method 700 of facilitating RDMA transactions using one or more unified RDMA operations, as performed by a requesting side, method 800 of facilitating RDMA transactions using one or more unified RDMA operations, as performed by a receiving side, and method 900 of facilitating RDMA transactions using arrival indicator attributes.

Executable instructions 1122 can also reside, completely or at least partially, within main memory 1104 and/or within processing device 1102 during execution thereof by example computer device 1100, main memory 1104 and processing device 1102 also constituting computer-readable storage media. Executable instructions 1122 can further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

The disclosed embodiments are illustrated with the following examples. In Example 1, a network controller configured to: receive a first operation request from a requestor device to communicate a data to a target memory; and communicate, using a second operation request, the data to a target network controller communicatively coupled to the target memory, wherein at least one of the first operation request or the second operation request is a unified operation request comprising: an operand identifying the data; a destination memory address to store the data in the target memory; and an operation code recognizable, by a corresponding recipient device, as a request to update an arrival indicator in the target memory responsive to arrival of one or more portions of the data at the target memory.

In Example 2, the network controller of Example 1, wherein the data is received from the requestor device using a Peripheral Component Interconnect Express (PCIe) connection, a Compute Express Link (CXL) connection, an NVLink connection, or a chip-to-chip connection.

In Example 3, the network controller of Example 1, wherein the data is communicated to the target network controller using an RDMA over Convergent Ethernet connection or an InfiniBand connection.

In Example 4, the network controller of Example 1, wherein the unified operation request further comprises: a memory address to store the arrival indicator in the target memory.

In Example 5, the network controller of Example 1, wherein the operation code is to cause the target memory to modify the arrival indicator each time a predetermined amount of the data is stored in the target memory.

In Example 6, the network controller of Example 1, wherein the unified operation request further comprises: a granularity parameter, and wherein the operation code is to cause the target memory to modify the arrival indicator each time a number of memory units of the data corresponding to the granularity parameter is stored in the target memory.

In Example 7, the network controller of Example 1, wherein the operation code is to cause the target memory to modify the arrival indicator using an atomic operation.

In Example 8, the network controller of Example 1, wherein the operation code is to cause the target memory to set a value of the arrival indicator to a predetermined value responsive to all units of the data stored in the target memory, wherein the predetermined value is independent of a size of the data.

In Example 9, the network controller of Example 1, wherein the data is communicated to the target network controller over a plurality of network paths.

In Example 10, the network controller of Example 1, further configured to: receive, using an additional operation request generated by the requestor device, an additional data from the requestor device, wherein the additional operation request comprises an additional destination memory address to store the additional data in the target memory, wherein the operand of the second operation request further identifies the additional data, and wherein the second operation request is to cause the target memory to modify the arrival indicator each time an amount of the data or an amount of the additional data is stored in the target memory.

In Example 11, the network controller of Example 1, wherein, to communicate the data to the target network controller, the network controller is to: generate a first sub-request; communicate, using the first sub-request, a first portion of the data to the target network controller, wherein the first sub-request comprises a first destination memory address to store the first portion of the data in the target memory; generate a second sub-request; and communicate, using the second sub-request, a second portion of the data to the target network controller, wherein the second sub-request comprises a second destination memory address to store the second portion of the data in the target memory; wherein each of the first sub-request and the second sub-request is to cause the target memory to modify the arrival indicator each time an amount of the first portion of the data or an amount of the second portion of the data is stored in the target memory.

In Example 12, the network controller of Example 11, wherein each of the first operation request and the second operation request is a unified operation request.

In Example 13, a network controller configured to: receive a first operation request from a requestor network controller to communicate a data to a target memory; and communicate, using a second operation request, the data to the target memory, wherein at least one of the first operation request or the second operation request is a unified operation request comprising: an operand comprising the data; a destination memory address to store the data in the target memory; and an operation code recognizable, by a corresponding recipient device, as a request to update an arrival indicator in the target memory responsive to arrival of one or more portions of the data at the target memory.

In Example 14, the network controller of Example 13, wherein the data is communicated from the network controller to the target memory using a Peripheral Component Interconnect Express (PCIe) connection, a Compute Express Link (CXL) connection, an NVLink connection, or a chip-to-chip connection.

In Example 15, the network controller of Example 13, wherein the data is received from the requestor network controller by the network controller using an RDMA over Convergent Ethernet connection or an InfiniBand connection.

In Example 16, the network controller of Example 13, wherein the unified operation request further comprises: a memory address to store the arrival indicator in the target memory.

In Example 17, the network controller of Example 13, wherein the operation code is to cause the target memory to modify the arrival indicator each time a predetermined amount of the data is stored in the target memory.

In Example 18, the network controller of Example 13, wherein the unified operation request further comprises: a granularity parameter, and wherein the operation code is to cause the target memory to modify the arrival indicator each time a number of memory units of the data corresponding to the granularity parameter is stored in the target memory.

In Example 19, the network controller of Example 13, wherein the operation code is to cause the target memory to modify the arrival indicator using an atomic operation.

In Example 20, the network controller of Example 13, wherein the operation code is to cause the target memory to set a value of the arrival indicator to a predetermined value responsive to all units of the data stored in the target memory, wherein the predetermined value is independent of a size of the data.

In Example 21, the network controller of Example 13, wherein the data is communicated from the requestor network controller over a plurality of network paths.

In Example 22, the network controller of Example 13, further configured to: receive, using an additional operation request generated by the requestor network controller, an additional data from the requestor network controller, wherein the additional operation request comprises an additional destination memory address to store the additional data in the target memory, wherein the operand of the second operation request further identifies the additional data, and wherein the second operation request is to cause the target memory to modify the arrival indicator each time an amount of the data or an amount of the additional data is stored in the target memory.

In Example 23, the network controller of Example 13, wherein, to communicate the data to the target memory, the network controller is to: generate a first sub-request; communicate, using the first sub-request, a first portion of the data to the target memory, wherein the first sub-request comprises a first destination memory address to store a first portion of the data in the target memory, generate a second sub-request; and communicate, using the second sub-request, a second portion of the data to the target memory, wherein the second sub-request comprises a second destination memory address to store the second portion of the data in the target memory, and wherein each of the first sub-request and the second sub-request is to cause the target memory to modify the arrival indicator each time an amount of the first portion of the data or an amount of the second portion of the data is stored in the target memory.

In Example 24, the network controller of Example 13, wherein each of the first operation request and the second operation request is a unified operation request.

In Example 25, a method comprising: using a first operation request, generated by a requestor device, to communicate a data to a first network controller; and using a second operation request, generated by the first network controller, to communicate the data from the first network controller to a second network controller communicatively coupled to a target memory, wherein at least one of the first operation request or the second operation request is a unified operation request comprising: an operand identifying the data; a destination memory address to store the data in the target memory; and an operation code recognizable, by a corresponding recipient device, as a request to update an arrival indicator in the target memory responsive to arrival of one or more portions of the data at the target memory.

In Example 26, the method of Example 25, wherein the data is communicated from the requestor device to the first network controller using a Peripheral Component Interconnect Express (PCIe) connection, a Compute Express Link (CXL) connection, an NVLink connection, or a chip-to-chip connection.

In Example 27, the method of Example 25, wherein the data is communicated from the first network controller to the second network controller using an RDMA over Convergent Ethernet connection or an InfiniBand connection.

In Example 28, the method of Example 25, wherein the unified operation request further comprises: a memory address to store the arrival indicator in the target memory.

In Example 29, the method of Example 25, wherein the operation code is to cause the target memory to modify the arrival indicator each time a predetermined amount of the data is stored in the target memory.

In Example 30, the method of Example 25, wherein the unified operation request further comprises: a granularity parameter, and wherein the operation code is to cause the target memory to modify the arrival indicator each time a number of memory units of the data corresponding to the granularity parameter is stored in the target memory.

In Example 31, the method of Example 25, wherein the operation code is to cause the target memory to modify the arrival indicator using an atomic operation.

In Example 32, the method of Example 25, wherein the operation code is to cause the target memory to set a value of the arrival indicator to a predetermined value responsive to all units of the data stored in the target memory, wherein the predetermined value is independent of a size of the data.

In Example 33, the method of Example 25, wherein the data is communicated from the first network controller to the second network controller over a plurality of network paths.

In Example 34, the method of Example 25, further comprising: using an additional operation request, generated by the requestor device, to communicate an additional data from the requestor device to the first network controller, wherein the additional operation request comprises an additional destination memory address to store the additional data on the target memory, wherein the operand of the second operation request further identifies the additional data, and wherein the second operation request is to cause the target memory to modify the arrival indicator each time an amount of the data or an amount of the additional data is stored in the target memory.

In Example 35, the method of Example 25, wherein communicating the data from the first network controller to the second network controller comprises: using a first sub-request to communicate a first portion of the data to the second network controller, wherein the first sub-request comprises: a first destination memory address to store the first portion of the data in the target memory; and using a second sub-request to communicate a second portion of the data to the second network controller, wherein the second sub-request comprises: a second destination memory address to store the second portion of the data in the target memory, and wherein each of the first sub-request and the second sub-request is to cause the target memory to modify the arrival indicator each time an amount of the first portion of the data or an amount of the second portion of the data is stored in the target memory.

In Example 36, the method of Example 25, wherein each of the first operation request and the second operation request is a unified operation request.

In Example 37, a method comprising: using a first operation request, generated by a first network controller communicatively coupled to a requestor device, to receive a data from the first network controller to a second network controller; and using a second operation request, generated by the second network controller, to communicate the data from the second network controller to a target memory, wherein at least one of the first operation request or the second operation request is a unified operation request comprising: an operand comprising the data; a destination memory address to store the data in the target memory; and an operation code recognizable, by a corresponding recipient device, as a request to update an arrival indicator in the target memory responsive to arrival of one or more portions of the data at the target memory.

In Example 38, the method of Example 37, wherein the data is communicated from the second network controller to the target memory using a Peripheral Component Interconnect Express (PCIe) connection, a Compute Express Link (CXL) connection, an NVLink connection, or a chip-to-chip connection.

In Example 39, the method of Example 37, wherein the data is communicated from the first network controller to the second network controller using an RDMA over Convergent Ethernet connection or an InfiniBand connection.

In Example 40, the method of Example 37, wherein the unified operation request further comprises: a memory address to store the arrival indicator in the target memory.

In Example 41, the method of Example 37, wherein the operation code is to cause the target memory to modify the arrival indicator each time a predetermined amount of the data is stored in the target memory.

In Example 42, the method of Example 37, wherein the unified operation request further comprises: a granularity parameter, and wherein the operation code is to cause the target memory to modify the arrival indicator each time a number of memory units of the data corresponding to the granularity parameter is stored in the target memory.

In Example 43, the method of Example 37, wherein the operation code is to cause the target memory to modify the arrival indicator using an atomic operation.

In Example 44, the method of Example 37, wherein the operation code is to cause the target memory to set a value of the arrival indicator to a predetermined value responsive to all units of the data stored in the target memory, wherein the predetermined value is independent of a size of the data.

In Example 45, the method of Example 37, wherein the data is communicated from the first network controller to the second network controller over a plurality of network paths.

In Example 46, the method of Example 37, further comprising: using an additional operation request, generated by the first network controller, to communicate an additional data from the first network controller to the second network controller, wherein the additional operation request comprises an additional destination memory address to store the additional data in the target memory, wherein the operand of the second operation request further identifies the additional data, and wherein the second operation request is to cause the target memory to modify the arrival indicator each time an amount of the data or an amount of the additional data is stored in the target memory.

In Example 47, the method of Example 37, wherein communicating the data from the second network controller to the target memory comprises: using a first sub-request to communicate a first portion of the data to the target memory, wherein the first sub-request comprises: a first destination memory address to store a first portion of the data in the target memory, and using a second sub-request to communicate a second portion of the data to the target memory, wherein the second sub-request comprises: a second destination memory address to store the second portion of the data in the target memory, and wherein each of the first sub-request and the second sub-request is to cause the target memory to modify the arrival indicator each time an amount of the first portion of the data or an amount of the second portion of the data is stored in the target memory.

In Example 48, the method of Example 37, wherein each of the first operation request and the second operation request is a unified operation request.

In Example 49, a method comprising: using a first operation request, generated by a first network controller communicatively coupled to a requestor device, to receive a data from a first network controller by a second network controller, wherein the first operation request comprises a destination memory address to store the data on a target memory; and responsive to determining that the destination memory address is associated with an arrival indicator attribute, using a second operation request generated by the second network controller, to communicate the data from the second network controller to the target memory, wherein the second operation request is a unified operation request comprising: the data; the destination memory address; and an operation code recognizable, by the target memory, as a request to update an arrival indicator in the target memory responsive to arrival of one or more portions of the data at the target memory.

In Example 50, the method of Example 49, wherein determining that the destination memory address is associated with the arrival indicator attribute comprises: accessing a table of address attributes associated with the target memory.

In Example 51, the method of Example 49, wherein the unified operation request further comprises: a memory address to store the arrival indicator in the target memory.

In Example 52, the method of Example 49, wherein the operation code is to cause the target memory to modify the arrival indicator each time a predetermined amount of the data is stored in the target memory.

In Example 53, the method of Example 49, wherein the unified operation request further comprises: a granularity parameter; and wherein the operation code is to cause the target memory to modify the arrival indicator each time a number of memory units of the data corresponding to the granularity parameter is stored in the target memory.

In Example 54, the method of Example 49, wherein the operation code is to cause the target memory to set a value of the arrival indicator to a predetermined value responsive to all units of the data stored in the target memory, wherein the predetermined value is independent of a size of the data.

In Example 55, a system comprising: a requestor device to: generate a first operation request; and a network controller to: receive, using the first operation request, a data from the requestor device; generate a second operation request; and communicate, using the second operation request, the data from the network controller to a target network controller communicatively coupled to a target memory, wherein at least one of the first operation request or the second operation request is a unified operation request comprising: an operand identifying the data; a destination memory address to store the data in the target memory; and an operation code recognizable, by a corresponding recipient device, as a request to update an arrival indicator in the target memory responsive to arrival of one or more portions of the data at the target memory.

In Example 56, the system of Example 55, wherein the requestor device is further to: generate an additional operation request; and communicate, using the additional operation request, an additional data to the network controller, wherein the additional operation request comprises an additional destination memory address to store the additional data on the target memory, wherein the operand of the second operation request further identifies the additional data, and wherein the second operation request is to cause the target memory to modify the arrival indicator each time an amount of the data or an amount of the additional data is stored in the target memory.

In Example 57, the system of Example 55, wherein, to communicate the data to the target network controller, the network controller is to: generate a first sub-request; communicate, using the first sub-request, a first portion of the data to the target network controller, wherein the first sub-request comprises a first destination memory address to store the first portion of the data in the target memory; generate a second sub-request; and communicate, using the second sub-request, a second portion of the data to the target network controller, wherein the second sub-request comprises a second destination memory address to store the second portion of the data in the target memory, wherein each of the first sub-request and the second sub-request is to cause the target memory to modify the arrival indicator each time an amount of the first portion of the data or an amount of the second portion of the data is stored in the target memory.

In Example 58, a system comprising: a network controller to: receive, using a first operation request generated by a requestor network controller, a data from the requestor network controller; and generate a second operation request; and a target memory to: receive, using the second operation request, the data from the network controller; wherein at least one of the first operation request or the second operation request is a unified operation request comprising: an operand comprising the data; a destination memory address to store the data in the target memory; and an operation code recognizable, by a corresponding recipient device, as a request to update an arrival indicator in the target memory responsive to arrival of one or more portions of the data at the target memory.

In Example 59, the system of Example 58, wherein the network controller is further to: receive, using an additional operation request generated by the requestor network controller, an additional data from the requestor network controller, wherein the additional operation request comprises an additional destination memory address to store the additional data in the target memory, wherein the operand of the second operation request further identifies the additional data, and wherein the second operation request is to cause the target memory to modify the arrival indicator each time an amount of the data or an amount of the additional data is stored in the target memory.

In Example 60, the system of Example 58, wherein, to communicate the data to the target memory, the network controller is to: generate a first sub-request; communicate, using the first sub-request, a first portion of the data to the target memory, wherein the first sub-request comprises a first destination memory address to store a first portion of the data in the target memory, generate a second sub-request; and communicate using the second sub-request to communicate a second portion of the data to the target memory; wherein the second sub-request comprises a second destination memory address to store the second portion of the data in the target memory, wherein each of the first sub-request and the second sub-request is to cause the target memory to modify the arrival indicator each time an amount of the first portion of the data or an amount of the second portion of the data is stored in the target memory.

In Example 61, a network controller configured to: receive a first operation request from a requestor device to retrieve a data from a target memory; and communicate a second operation request to a target network controller communicatively coupled to the target memory, wherein the first operation request and the second operation request comprise a location of the data in the target memory, and wherein at least one of the first operation request or the second operation request is a unified operation request comprising a first operation code recognizable, by the target network controller, as a request to update an arrival indicator in a memory accessible to the requestor device in response to arrival of one or more portions of the data at the memory accessible to the requestor device.

In Example 62, the network controller of Example 61, configured further to: receive an operation response from the target network controller, the operation response comprising the data and a second operation code, wherein the second operation code is recognizable, by the network controller, as the request to update the arrival indicator in the memory accessible to the requestor device; and responsive to receiving the operation response: store the data in the memory of the requestor device; and update the arrival indicator in the memory accessible to the requestor device.

In Example 63, the network controller of Example 62, wherein the arrival indicator in the memory of the requestor device is updated each time a predetermined amount of the data is stored in the memory accessible to the requestor device.

In Example 64, the network controller of Example 61, wherein the first operation request is received from the requestor device by the network controller using a Peripheral Component Interconnect Express (PCIe) connection, a Compute Express Link (CXL) connection, an NVLink connection, or a chip-to-chip connection.

In Example 65, the network controller of Example 61, wherein the second operation request is communicated from the network controller to the target network controller the data using an RDMA over Convergent Ethernet connection or an InfiniBand connection.

In Example 66, a network controller configured to: receive a first operation request from a requestor network controller to retrieve a data from a target memory communicatively coupled to the network controller; and communicate a second operation request to the target memory, wherein the first operation request and the second operation request comprise a location of the data in the target memory, and wherein at least one of the first operation request or the second operation request is a unified operation request comprising a first operation code recognizable, by the target network controller, as a request to update an arrival indicator in the memory accessible to the requestor device in response to arrival of one or more portions of the data at the memory accessible to the requestor device.

In Example 67, the network controller of Example 66, configured further to: receive a first operation response from the target memory, the first operation response comprising the data and a second operation code, wherein the second operation code is recognizable, by the network controller, as the request to update the arrival indicator in the memory accessible to the requestor device; and responsive to receiving the first operation response, communicate a second operation response to the requestor network controller, wherein the second operation response is recognizable, by the requestor network controller, as the request to update the arrival indicator in the memory accessible to the requestor device in response to arrival of one or more portions of the data at the memory accessible to the requestor device.

In Example 68, the network controller of Example 66, configured further to: receive a first operation response from the target memory, the first operation response comprising the data and a second operation code, wherein the second operation code is recognizable, by the network controller, as the request to set a value of the arrival indicator to a predetermined value responsive to all units of the data stored in the memory accessible to the requestor device, wherein the predetermined value is independent of a size of the data.

In Example 69, the network controller of Example 66, wherein the second operation request is communicated from the network controller to the target memory using a Peripheral Component Interconnect Express (PCIe) connection, a Compute Express Link (CXL) connection, an NVLink connection, or a chip-to-chip connection.

In Example 70, the network controller of Example 66, wherein the first operation request is received from the requestor network controller to the network controller using an RDMA over Convergent Ethernet connection or an InfiniBand connection.

In Example 71, a network controller configured to: receive a first operation request from a requestor device to retrieve a data from a target memory; communicate a second operation request to a target network controller communicatively coupled to the target memory, wherein the first operation request and the second operation request comprise a location of the data in the target memory; receive an operation response from the target network controller, the operation response comprising the data retrieved from the target memory and a destination memory address in a memory accessible to the requestor device; and responsive to determining that the destination memory address is associated with an arrival indicator attribute: cause the data to be stored in the memory accessible to the requestor device; and cause an arrival indicator in the memory accessible to the requestor device to be updated in response to arrival of one or more portions of the data at the memory accessible to the requestor device.

In Example 72, the network controller of Example 71, wherein the arrival indicator in the memory accessible to the requestor device is updated each time a predetermined amount of the data is stored in the memory accessible to the requestor device.

In Example 73, the network controller of Example 71, wherein to cause then arrival indicator to be updated, the network controller is to cause the arrival indicator to be set to a predetermined value responsive to all units of the data stored in the memory accessible to the requestor device, wherein the predetermined value is independent of a size of the data.

In Example 74, the network controller of Example 71, wherein the first operation request is received from the requestor device to the network controller using a Peripheral Component Interconnect Express (PCIe) connection, a Compute Express Link (CXL) connection, an NVLink connection, or a chip-to-chip connection.

In Example 75, the network controller of Example 71, wherein the second operation request is communicated from the network controller to the target network controller using an RDMA over Convergent Ethernet connection or an InfiniBand connection.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
using a first operation request, generated by a requestor device, to communicate a data to a first network controller; and
using a second operation request, generated by the first network controller, to communicate the data from the first network controller to a second network controller communicatively coupled to a target memory, wherein at least one of the first operation request or the second operation request is a unified operation request comprising:
an operand identifying the data;
a destination memory address to store the data in the target memory; and
an operation code recognizable, by a corresponding recipient device, as a request to update an arrival indicator in the target memory responsive to arrival of one or more portions of the data at the target memory.

2. The method of claim 1, wherein the data is communicated from the requestor device to the first network controller using a Peripheral Component Interconnect Express (PCIe) connection, a Compute Express Link (CXL) connection, an NVLink connection, or a chip-to-chip connection.

3. The method of claim 1, wherein the data is communicated from the first network controller to the second network controller using an RDMA over Convergent Ethernet connection or an InfiniBand connection.

4. The method of claim 1, wherein the unified operation request further comprises a memory address to store the arrival indicator in the target memory.

5. The method of claim 1, wherein the operation code is to cause the target memory to modify the arrival indicator each time a predetermined amount of the data is stored in the target memory.

6. The method of claim 1, wherein the unified operation request further comprises a granularity parameter, and wherein the operation code is to cause the target memory to modify the arrival indicator each time a number of memory units of the data corresponding to the granularity parameter is stored in the target memory.

7. The method of claim 1, wherein the operation code is to cause the target memory to modify the arrival indicator using an atomic operation.

8. The method of claim 1, wherein the operation code is to cause the target memory to set a value of the arrival indicator to a predetermined value responsive to all units of the data stored in the target memory, wherein the predetermined value is independent of a size of the data.

9. The method of claim 1, wherein the data is communicated from the first network controller to the second network controller over a plurality of network paths.

10. The method of claim 1, further comprising:
using an additional operation request, generated by the requestor device, to communicate an additional data from the requestor device to the first network controller,
wherein the additional operation request comprises an additional destination memory address to store the additional data on the target memory,
wherein the operand of the second operation request further identifies the additional data, and wherein the second operation request is to cause the target memory to modify the arrival indicator each time an amount of the data or an amount of the additional data is stored in the target memory.

11. The method of claim 1, wherein communicating the data from the first network controller to the second network controller comprises:
using a first sub-request to communicate a first portion of the data to the second network controller, wherein the first sub-request comprises:
a first destination memory address to store the first portion of the data in the target memory; and
using a second sub-request to communicate a second portion of the data to the second network controller, wherein the second sub-request comprises:
a second destination memory address to store the second portion of the data in the target memory, and
wherein each of the first sub-request and the second sub-request is to cause the target memory to modify the arrival indicator each time an amount of the first portion of the data or an amount of the second portion of the data is stored in the target memory.

12. The method of claim 1, wherein each of the first operation request and the second operation request is a unified operation request.

13. A method comprising:
using a first operation request, generated by a first network controller communicatively coupled to a requestor device, to receive a data from the first network controller to a second network controller; and
using a second operation request, generated by the second network controller, to communicate the data from the second network controller to a target memory, wherein at least one of the first operation request or the second operation request is a unified operation request comprising:
an operand comprising the data;
a destination memory address to store the data in the target memory; and
an operation code recognizable, by a corresponding recipient device, as a request to update an arrival indicator in the target memory responsive to arrival of one or more portions of the data at the target memory.

14. The method of claim 13, wherein the data is communicated from the second network controller to the target memory using a Peripheral Component Interconnect Express (PCIe) connection, a Compute Express Link (CXL) connection, an NVLink connection, or a chip-to-chip connection.

15. The method of claim 13, wherein the data is communicated from the first network controller to the second network controller using an RDMA over Convergent Ethernet connection or an InfiniBand connection.

16. The method of claim 13, wherein the unified operation request further comprises a memory address to store the arrival indicator in the target memory.

17. The method of claim 13, wherein the operation code is to cause the target memory to modify the arrival indicator each time a predetermined amount of the data is stored in the target memory.

18. The method of claim 13, wherein the unified operation request further comprises a granularity parameter, and wherein the operation code is to cause the target memory to modify the arrival indicator each time a number of memory units of the data corresponding to the granularity parameter is stored in the target memory.

19. The method of claim 13, wherein the operation code is to cause the target memory to modify the arrival indicator using an atomic operation.

20. The method of claim 13, wherein the operation code is to cause the target memory to set a value of the arrival indicator to a predetermined value responsive to all units of the data stored in the target memory, wherein the predetermined value is independent of a size of the data.

21. The method of claim 13, wherein the data is communicated from the first network controller to the second network controller over a plurality of network paths.

22. The method of claim 13, further comprising:
using an additional operation request, generated by the first network controller, to communicate an additional data from the first network controller to the second network controller,
wherein the additional operation request comprises an additional destination memory address to store the additional data in the target memory,
wherein the operand of the second operation request further identifies the additional data, and
wherein the second operation request is to cause the target memory to modify the arrival indicator each time an amount of the data or an amount of the additional data is stored in the target memory.

23. The method of claim 13, wherein communicating the data from the second network controller to the target memory comprises:
using a first sub-request to communicate a first portion of the data to the target memory, wherein the first sub-request comprises:
a first destination memory address to store a first portion of the data in the target memory, and
using a second sub-request to communicate a second portion of the data to the target memory, wherein the second sub-request comprises:
a second destination memory address to store the second portion of the data in the target memory, and
wherein each of the first sub-request and the second sub-request is to cause the target memory to modify the arrival indicator each time an amount of the first portion of the data or an amount of the second portion of the data is stored in the target memory.

24. The method of claim 13, wherein each of the first operation request and the second operation request is a unified operation request.

25. A system comprising:
a network controller to:
receive, using a first operation request generated by a requestor network controller, a data from the requestor network controller; and
generate a second operation request; and
a target memory to:
receive, using the second operation request, the data from the network controller;
wherein at least one of the first operation request or the second operation request is a unified operation request comprising:
an operand comprising the data;
a destination memory address to store the data in the target memory; and
an operation code recognizable, by a corresponding recipient device, as a request to update an arrival indicator in the target memory responsive to arrival of one or more portions of the data at the target memory.

26. The system of claim 25, wherein the network controller is further to:
- receive, using an additional operation request generated by the requestor network controller, an additional data from the requestor network controller,
- wherein the additional operation request comprises an additional destination memory address to store the additional data in the target memory,
- wherein the operand of the second operation request further identifies the additional data, and
- wherein the second operation request is to cause the target memory to modify the arrival indicator each time an amount of the data or an amount of the additional data is stored in the target memory.

27. The system of claim 25, wherein, to communicate the data to the target memory, the network controller is to:
- generate a first sub-request;
- communicate, using the first sub-request, a first portion of the data to the target memory, wherein the first sub-request comprises a first destination memory address to store a first portion of the data in the target memory,
- generate a second sub-request; and
- communicate using the second sub-request to communicate a second portion of the data to the target memory; wherein the second sub-request comprises a second destination memory address to store the second portion of the data in the target memory,
- wherein each of the first sub-request and the second sub-request is to cause the target memory to modify the arrival indicator each time an amount of the first portion of the data or an amount of the second portion of the data is stored in the target memory.

\* \* \* \* \*